US008705639B2

(12) United States Patent
Salinger

(10) Patent No.: US 8,705,639 B2
(45) Date of Patent: Apr. 22, 2014

(54) SIGNAL MONITORING PLATFORM

(75) Inventor: Jorge D. Salinger, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 203 days.

(21) Appl. No.: 13/277,091

(22) Filed: Oct. 19, 2011

(65) Prior Publication Data
US 2013/0101071 A1    Apr. 25, 2013

(51) Int. Cl.
H04L 27/00    (2006.01)

(52) U.S. Cl.
USPC ........................................................ 375/259

(58) Field of Classification Search
USPC ......... 375/224, 228, 257, 259–260, 320, 316, 375/340, 349; 455/132, 137, 161.1, 179.1
See application file for complete search history.

(56) References Cited

U.S. PATENT DOCUMENTS

| | | | | |
|---|---|---|---|---|
| 5,267,244 | A * | 11/1993 | Messerschmitt et al. | 370/342 |
| 6,487,721 | B1 * | 11/2002 | Safadi | 725/36 |
| 8,089,946 | B2 * | 1/2012 | Brommer | 370/346 |
| 8,139,704 | B2 * | 3/2012 | Heinrich | 375/376 |
| 2005/0066085 | A1 * | 3/2005 | Kobayashi | 710/62 |
| 2005/0113143 | A1 * | 5/2005 | Oiwa | 455/562.1 |
| 2006/0126750 | A1 * | 6/2006 | Friedman | 375/260 |
| 2007/0089148 | A1 * | 4/2007 | Oh et al. | 725/90 |
| 2008/0051049 | A1 * | 2/2008 | Katoh et al. | 455/205 |
| 2009/0097600 | A1 * | 4/2009 | Arambepola et al. | 375/347 |
| 2009/0163224 | A1 * | 6/2009 | Dean et al. | 455/456.1 |
| 2009/0278992 | A1 * | 11/2009 | Gutknecht et al. | 348/706 |
| 2010/0316104 | A1 * | 12/2010 | Chapman et al. | 375/222 |
| 2011/0162020 | A1 * | 6/2011 | Kahn et al. | 725/82 |
| 2011/0211693 | A1 * | 9/2011 | Carvalho et al. | 380/200 |
| 2012/0034937 | A1 * | 2/2012 | Cahill et al. | 455/465 |
| 2012/0060182 | A1 * | 3/2012 | Hardin | 725/31 |

\* cited by examiner

*Primary Examiner* — Jean B Corrielus
(74) *Attorney, Agent, or Firm* — Ballard Spahr LLP

(57) ABSTRACT

Aspects of the disclosure relate to signal monitoring at edge of a network domain in a network. A monitoring device can evaluate communication quality of information streams in downstream frequency channels, and operation conditions in a telecommunication network. In one aspect, communication quality can be evaluated at the physical layer level or at a higher-layer level containing payload data. In response to an operation issue, the monitoring device can transmit a notification to a node of a distribution platform of the telecommunication network.

25 Claims, 11 Drawing Sheets

SIGNAL MONITORING PLATFORM

BACKGROUND

As telecommunication networks become more sophisticated, providing new services and related content (e.g., media (video, music, etc.), advertisement, notifications, or the like) and receiving signaling (instructions, queries, etc.), monitoring network performance becomes more prevalent in order to ensure at least satisfactory perceived quality of service. Conventional monitoring solutions typically leverage existing network platforms and associated infrastructure and protocols. Such solutions generally lack in network integration capabilities, and generally fail to provide information that is sufficiently rich to be commensurate with the complexity of the new services and the entailing sophistication and costs of network operation.

SUMMARY

Certain embodiments of the subject disclosure provide signal monitoring at the edge of a network domain in a telecommunication network. A monitoring device can evaluate communication quality of information streams in downstream frequency channels, and operation conditions in a telecommunication network. Communication quality can be evaluated at the physical layer level or at a higher-layer level containing payload data. In response to an issue with operation conditions, the monitoring device can transmit a notification to a node of a distribution platform, the notification conveying information related to the nature of a detected issue. The monitoring device can integrate a high density of demodulators, such as quadrature amplitude modulation (QAM) demodulators, enabling a substantive volume of downstream carriers to be monitored. The monitoring device can integrate various signal distribution functions that can permit signal transmission from the edge originating node to a functional element in an access/delivery network. In one aspect, the monitoring device can include one or more passive combiner(s) that can consolidate output of the edge originating node, analog signals, out-of-band (OOB) signals, and test signals. In another aspect, the monitoring device can include a pilot unit having redundant pilot generator units that can produce various pilot tones. The monitoring device can provide transport stream playout functionality.

Various embodiments of the disclosure provide several advantages with respect to conventional solutions for monitoring network performance, wherein such solutions can include deploying a substantial number of physical layer monitoring probes in a distribution platform that supplies digital services in a service provider network. As one exemplary advantage, signal monitoring platforms of the disclosure can be implemented with marginal customization (modification, expansion, etc.) of the telecommunication network that supplies digital services. As another exemplary advantage, a signal monitoring platform of the disclosure can integrate redundant pilot signal generation for analog automatic gain control at a deployment site; downstream signal combination and analysis; and content playout to a network node for analysis that is supplementary or complementary to the analysis performed at the signal monitoring platform. Such downstream signal combination results in simplified cabling and reduced form factors at deployment sites. As yet another exemplary advantage, a signal monitoring platform disclosed herein can provide a broad scope of coverage of potential issues with a specific service (video on demand, linear programming, non-linear programming, broadband internet access, etc.) by integrating a high density of signal demodulators (e.g., QAM demodulators) which can permit monitoring a high volume of downstream carriers, such as QAM downstream carriers. Here, a downstream carrier refers to an information stream comprising data, signaling, or both, being delivered in downstream frequency channel. As still another exemplary advantage, the signal monitoring platform described herein can improve user experience by increasing monitoring scope in an access/delivery network, such as a wireless network, an optic fiber network, a coaxial cable network, or a hybrid fiber coaxial (HFC) network, through monitoring approaches that can complement or supplement conventional monitoring solutions. Improved monitoring between nodes in a distribution platform (e.g., a headend), nodes in an access/delivery network (e.g., an HFC network), and customer premises equipment (CPE) can reduce operational cost and repair time by exploiting always-on monitoring that can identify and isolate problems through various types of analysis, such as correlation and trending.

Additional features or advantages of the disclosure will be set forth in part in the description which follows, and in part will be apparent from the description, or may be learned by practice of the subject disclosure. The advantages of the disclosure can be realized and attained by means of the elements and combinations particularly pointed out in the appended claims. It is to be understood that both the foregoing general description and the following detailed description are exemplary and explanatory only and are not restrictive of the subject disclosure.

BRIEF DESCRIPTION OF THE DRAWINGS

The annexed drawings are an integral part of the subject disclosure and illustrate exemplary embodiments thereof. Together with the description set forth herein and claims appended hereto the annexed drawings serve to explain various principles, features, or aspects of the disclosure.

DETAILED DESCRIPTION

Figure 1A:
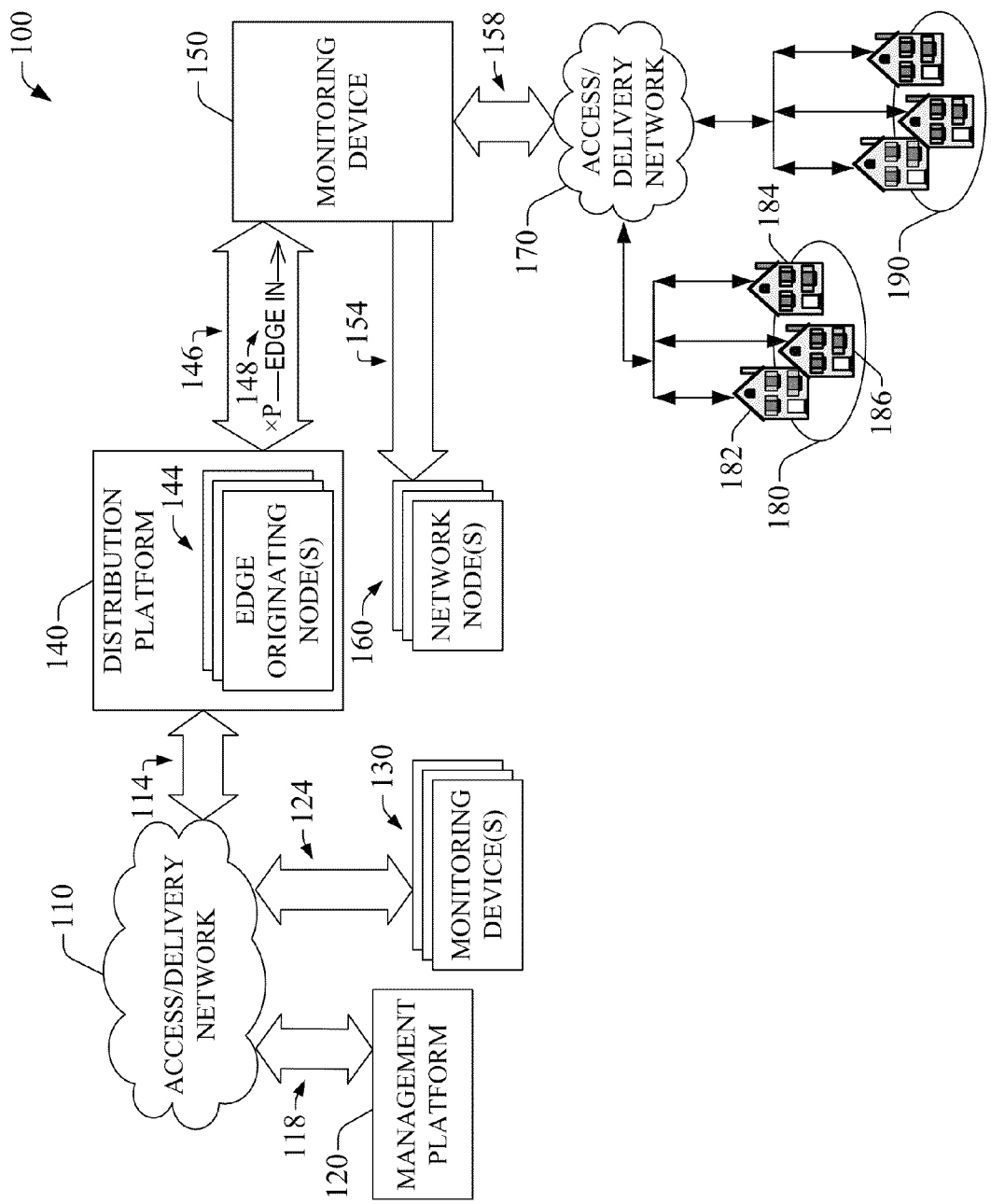
FIGS. 1A-1B illustrate exemplary network environments that enable monitoring communication quality of information streams in accordance with at least certain aspects of the disclosure.

The various aspects described herein can be understood more readily by reference to the following detailed description of exemplary embodiments of the subject disclosure and to the annexed drawings and their previous and following description.

Before the present systems, articles, apparatuses, and methods are disclosed and described, it is to be understood that the disclosure is not limited to specific systems, articles, apparatuses, and methods for monitoring communication quality and operation conditions in a telecommunication network. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As utilized in this specification and the annexed drawings, the terms "system," "component," "unit," "interface," "platform," "node," "function," "pipe," and the like are intended to include a computer-related entity or an entity related to an operational apparatus with one or more specific functionalities, wherein the computer-related entity or the entity related to the operational apparatus can be either hardware, a combination of hardware and software, software, or software in execution. Such entities also are referred to as "functional elements." As an example, a unit can be, but is not limited to being, a process running on a processor, a processor, an object (metadata object, data object, signaling object), an executable computer program, a thread of execution, a program, a memory (e.g., a hard-disc drive), and/or a computer. As another example, a unit can be an apparatus with specific functionality provided by mechanical parts operated by electric or electronic circuitry which is operated by a software application or a firmware application executed by a processor, wherein the processor can be internal or external to the apparatus and can execute at least a portion of the software application or the firmware application. As yet another example, a unit can be an apparatus that provides specific functionality through electronic functional elements without mechanical parts, the electronic functional elements can include a processor therein to execute software or firmware that provides, at least in part, the functionality of the electronic functional elements. The foregoing examples and related illustrations are but a few examples and are not intended to be limiting. In addition, while such illustrations are presented for a unit, the foregoing examples also apply to a node, a function, a controller, a component, a system, a platform, and the like. It is noted that in certain embodiments, or in connection with certain aspects or features such embodiments, the terms "unit," "component," "system," "interface," "platform" "node," "function," and "pipe" can be utilized interchangeably.

Throughout the description and claims of this specification, the words "comprise" and "having" and their variations, such as "comprising" and "comprises," "having" and "has," mean "including but not limited to," and are not intended to exclude, for example, other units, nodes, components, functions, interfaces, actions, steps, or the like. "Exemplary" means "an example of" and is not intended to convey an indication of a preferred or ideal embodiment. "Such as" is not used in a restrictive sense, but for explanatory purposes.

Reference will now be made in detail to the various embodiment(s) and related aspects of the subject disclosure, example(s) of which are illustrated in the accompanying drawings. Wherever possible, the same reference numbers are used throughout the drawings to refer to the same or like parts.

The disclosure addresses the issue of complex detection, correlation, and troubleshooting at the edge of a network domain, wherein processing of signals (broadcast data, narrowcast data, unicast data, signaling, etc.) is conducted prior to distribution to a user location. As described in greater detail below, a signal monitoring platform of the disclosure can enable monitoring communication quality of information streams (e.g., data streams, signaling streams, or the like) in downstream frequency channels and operation conditions in a telecommunication network. The downstream frequency channels can comprise a group of narrowcast channels associated with one or more subscriber groups, which consume narrowcast service. The downstream frequency channels also can comprise a group of broadcast channels.

Communication quality of such information streams can be monitored at the physical layer, assessing quality of information conveyed in the radio frequency (RF) layer, for example. In addition or in the alternative, communication quality can be evaluated in higher layers containing payload data (video data, audio data, etc.), evaluating quality of moving picture experts group (MPEG) transport stream (TS) layer, for example. While illustrated with transport streams, either multi-program transport streams (MPTSs) or single-program transport streams (SPTSs), formatted according to MPEG format (e.g., MPEG-2, MPEG-4), the monitoring features and related advantages can be implemented and achieved, respectively, in systems that communicate most any packetized flow of data or signaling. Communication quality can be monitored at the edge of a distribution platform, in a downstream access segment of an access/delivery network (e.g., a hybrid fiber coaxial (HFC) network). Accordingly, in contrast to conventional technology, the signaling monitoring platform described herein can permit substantive monitoring of signals and related payload data based on output of an edge originating node (e.g., an edge QAM node, a device consolidating functionality of an edge QAM node and a termination system, such as in one type of network, a cable modem termination system (CMTS), or the like) at which signal processing can be performed before the signals (e.g., RF signals) in the distribution platform are converted to a format (e.g., optical format) suitable for transmission of the signals in the access/delivery network. As another differentiator from conventional monitoring technology, the signal monitoring platform of the disclosure can effect proactive monitoring as an alternative or a supplement to reactive monitoring. Here, reactive monitoring can refer to monitoring associated with a specific service consumed at a specific downstream channel by a user in a service group, whereas proactive monitoring refers to assessment of communication quality, and detection and isolation of performance issues related to a service delivered in a group of downstream channels that are not tuned by a user at the time of monitoring such channels. Proactively monitoring at least one downstream channel (e.g., one such channel, several of such channels, or all such channel in a specific non-empty set) and identifying performance issues prior before customers tune to a service supplied in the at least one downstream channel can provide superior perceived and actual quality of service.

In certain embodiments, to accomplish the substantive monitoring described herein, signal monitoring platform of the disclosure can integrate a high density of demodulators, such as QAM demodulators, which can enable a high volume of downstream carriers, such as QAM downstream carriers. In other embodiments, the signal monitoring platform of the disclosure can integrate, into a single monitoring device, various signal distribution functions, including filtering and TS playout, that can permit signal transmission from the edge originating node (e.g., the edge QAM, the device consolidating functionality of an edge QAM node and the CMTS, or the like) to a functional element in the access/delivery network (e.g., a downstream laser in an HFC network). In one aspect of such integration, the monitoring device can include one or more required passive combiner(s) that can consolidate output of the edge originating node (e.g., the edge QAM, the device consolidating functionality of an edge QAM node and the CMTS, or the like), analog signals, out-of-band (OOB) signals, and test signals. In another aspect of integration can improve form factor with respect to conventional probes and simplify cabling within the distribution platform (e.g., a headend or a hub location). In yet another aspect, the monitoring device can include a pilot unit having redundant pilot generator units that can produce various pilot tones. The pilot unit can enable plant AGC in those nodes and amplifiers that exploit pilot signaling for operation.

In certain scenarios, the signal monitoring platform of the disclosure can comprise a monitoring device that can actively scan several QAM channels across the downstream spectrum of channels available to a service provider in order to probe for issues in an MPEG transport stream that may affect customer service. In response to detection of a performance issue, the monitoring device can transmit a notification to a node of a distribution platform (e.g., headend or a device consolidating functionality of an edge QAM node and a termination system, such as in one type of network, a CMTS) the notification conveying information related to the nature of a detected issue. Detection of performance issues can be exploited to emphasize monitoring in downstream channel(s) in which such issues are revealed during current scanning or have occurred historically. For example, monitoring can be conducted for a specified downstream channel—which can be referred to as "parked" in such channel—in which performance issues occur intermittently in order to establish aspects of the performance issues and cause(s) of such issues.

The described signal monitoring platform can provide playout functionality that can be exploited to coordinate analysis in analysis tools available at network nodes deployed in various parts of a telecommunication network or configured for local operation in the field. Such analysis can further characterize the nature of issues uncovered through the disclosed signal monitoring platform. Analysis features and associated monitoring performed by a signal monitoring platform of the disclosure can be configurable and extensible, affording analysis of increasing complexity as network deployment and related digital services complexity increases (e.g., more numerically intensive modulation or encoding).

Figure 1B:
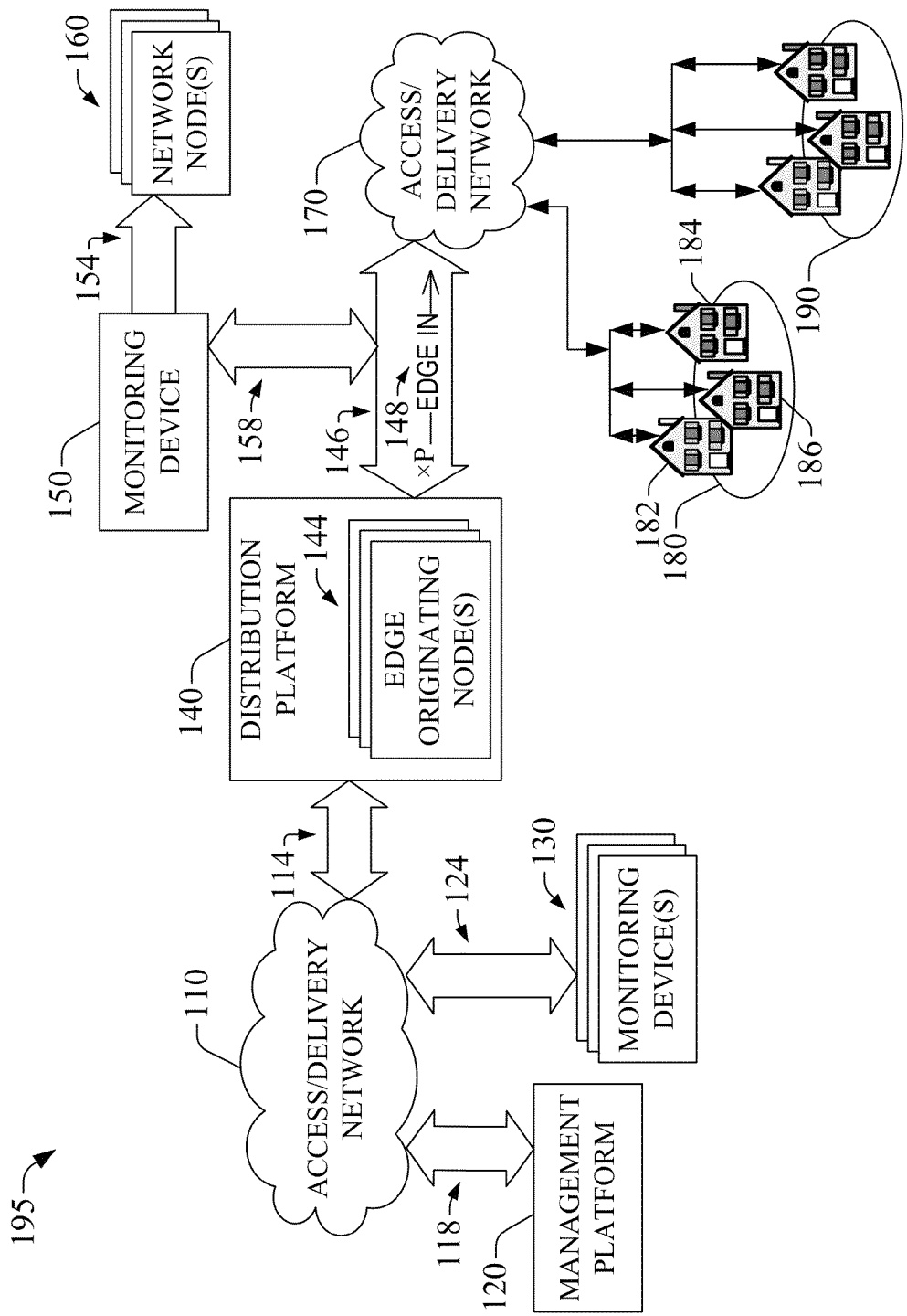

Referring to the drawings, FIG. 1 illustrates a high-level block diagram of an exemplary network environment 100 in which monitoring of communication quality of information streams (data streams, signaling streams, etc.) can be implemented in accordance with aspects of the disclosure. The exemplary network environment 100 comprises an access/delivery network 110 which can include wireless networks, wireline networks, and any combination thereof. Access/delivery network 110 can include one or more of wide area networks (WANs), one or more local area networks (LANs), signaling networks (e.g., SS#7), etc.), and so forth. Such networks can operate in accordance with most any communication protocol for wireline communication or wireless communication. In certain embodiments, access/delivery network 110 can have internal structure, with several functional elements that can provide two main operational blocks: a backbone network (e.g., a high-capacity Internet network) and a regional access network (RAN). Both the backbone network and the regional access network (RAN) can be WANs, with the backbone network having a larger geographical scope than the RAN.

Access/delivery network 110, or a functional element thereof, can be functionally coupled (e.g., communicatively coupled) to a management platform 120 through a data and signaling pipe 118, and to a group of one or more monitoring device(s) 130 via a data and signaling pipe 124. Each of such data and signaling pipes can have an upstream link (or uplink (UL)) and a downstream link (or downlink (DL)). The data and signaling pipes can comprise one or more of: a reference link, and related components; a conventional bus architectures such as address buses, system buses; or a conventional link, such as an Ethernet connector, an F connector, an RS-232 connector, or the like; and so forth. Management platform 120 can be an access/delivery network-wide administration platform that can manage (e.g., probe or poll, monitor configure, control, etc.) one or more functional elements (components, nodes, systems, platforms, and so forth) of the exemplary network environment 100. In one aspect, management platform 120 can communicate with and manage one or more of (I) a functional element of distribution platform 140, such as at least one edge originating node of the group of one or more originating node(s) 144; (II) monitoring device 150; or (III) a device (not shown) dedicated to monitoring one or more functional elements of access/delivery network 170. In certain embodiments, management platform 120 can streamline implementation (e.g., execution) of spectrum surveillance, system integrity evaluations, load alignment or balancing at a deployment site or plant, or the like. In additional or alternative embodiments, management platform 120 can permit implementation of various network management operations (access authorization and accounting, billing, etc.); content integrity monitoring; or functionality comprising programming monitoring, advertisement monitoring, or both. In connection with the group of one or more device(s) 130, each device in such group can monitor signals, such as traffic (or data) and signaling, and related payload data. In one embodiment in which access/delivery network 110 comprises a backbone network and a RAN, the group of one or more monitoring device(s) 130 can comprise at least one monitoring device dedicated to monitoring signals, and associated payload data, that are received or transmitted through the backbone network, and at least one monitoring device dedicated to monitoring signals, and associated payload data, that are received or transmitted through the RAN.

Access/delivery network 110 is functionally coupled (e.g., communicatively coupled) to a distribution platform 140 via a data and signaling pipe 114. The data and signaling pipes can comprise one or more of a reference link, and related components; a conventional bus architectures such as address buses, system buses; or a conventional link, such as an Ethernet connector, an F connector, an RS-232 connector, or the like; and so forth. Distribution platform 140 can comprise one or more signaling processing component(s) (not shown) that can receive and operate on an information stream, such as a data stream, a signaling stream, a combination thereof. Such component(s) can perform one or more operations on the information stream, such encoding, modulation, multiplexing, up-conversion, combination, and the like. In one embodiment, at least one of such signaling processing component(s) can embody a termination system (e.g., a CMTS). As illustrated, the distribution platform 140 can comprise a group of one or more edge originating node(s) 144 that can transmit the information stream. In another embodiment, each edge originating node of the group of one or more originating node(s) 144 can embody a edge quadrature amplitude modulation (QAM) node. In another embodiment, each edge originating node of the group of one or more originating node(s) 144 can embody a device that consolidates the functionality of a termination system (e.g., a CMTS) and an edge node (e.g., an edge QAM node). While illustrated as a single block, in one or more embodiment(s), distribution platform 140 can be distributed, having a centralized deployment site (or plant) and a plurality of hub sites (also referred to as sites). In such embodiment(s), each one of the hub sites can comprise an edge originating node of the group of one or more edge originating node(s) 144.

Distribution platform 140 can receive data (data flows, audio signals, video signals, any combinations thereof, etc.) and signaling (control instructions, clock signals, etc.) from a functional element that is part of access/delivery network 110 or that is functionally coupled thereto. In one scenario, the functional element can be a server that supplies a combination of audio signal and video signal, such as an audiovisual signal comprising a video asset. The server can be, for example, a content server for pay-per-view programming or video-on-demand assets, an application server, a data server, a telephony server, a backbone network router, or the like. In such scenario, based on the formatting of the audiovisual signal, one or more signal processing component(s) (not shown) in distribution platform can operate on (encode, modulate, multiplex, up-convert, combine) the audiovisual signal and supply a resulting audiovisual signal to an edge originating node of the group of one or more edge originating node(s) 144. The edge originating node can transmit a plurality of P (a natural number) data streams, referred to as edge input (IN) 148, conveying at least a portion of the audiovisual signal. It should be appreciated that in certain embodiments, the edge originating node can operate on the audiovisual signal without reliance on such one or more signal processing component(s). In another scenario, a source node (e.g., a satellite transceiver coupled to a video camera) coupled to the distribution platform 140 can generate an audiovisual signal, which can be processed by one or more processing component(s) and supplied to an edge originating node of the one or more edge originating node(s) 144. Such edge originating node can transmit a plurality of P data streams, referred to as edge input (IN) 148, conveying at least a portion of the audiovisual signal.

In the illustrated network environment 100, a monitoring device 150 can receive the plurality of P edge IN 148 data streams via a data and signaling pipe 146, and can analyze at least a portion of the data conveyed in such data streams in accordance with aspects described herein. Analysis of such data permits monitoring communication quality of at least one data stream of the plurality of P edge IN 148 data streams. As described herein, communication quality can be assessed at the physical layer level or at higher layers, which permits evaluating communication quality of payload data transported in the at least one data stream. The monitor device 150 can convey, via data and signaling pipe 154, at least certain results of the analysis to a specific network node of the group of one or more network node(s) 160 for supplementary analysis or complementary analysis. The specific network node can be a computing device, which can be mobile, pseudo-stationary, or stationary, and can process information streams (e.g., an MPEG TS) received or transmitted in a telecommunication network. In one aspect, the computing device can be an analysis tool, such as a spectrum analyzer.

In addition or in the alternative, the monitoring device 150 can relay at least a portion (e.g., the entirety) of the plurality of P edge IN 148 data streams to an access/delivery network 170. To at least such end, the monitoring device 150 is functionally coupled (e.g., communicatively coupled) to the access/delivery network 170. As illustrated, such coupling is accomplished in an inline configuration wherein the monitoring device 150 receives information streams and other signals, such as test signals and out-of-band (OOB) signals from the distribution platform 140 and conveys at least a portion of such information stream and signals to the access/delivery network 170, or an element thereof. In certain network environments, such as exemplary network environment 195 presented in FIG. 1B, monitoring device 150 also can be deployed in a non-inline configuration.

The access/delivery network 170 is a WAN that can be embodied in a wireless network, a wireline network, or a combination thereof, and supplies data service(s), such as television programming, video on demand, Internet service, packet-switched telephony, to a user location which can be stationary (e.g., a location of a CPE) or mobile (e.g., a location of mobile device). Access/delivery network 170 can be embodied in an optic fiber network, a coaxial cable network, or an HFC cable network, an optic fiber network, a coaxial network, a wireless network, and the like. In an embodiment in which the access/delivery network 170 is an HFC cable network, data pipe and signaling 158 can comprise several optic fiber links and associated optical functional elements, such as downstream lasers, light amplifiers, last-mile fiber aggregator node, and the like. In addition, in such embodiment, delivery network can comprise various RF amplifiers and coaxial taps to respective dwellings (e.g., stationary user locations such as locations 182, 184, 186) wherein customer premises equipment (CPE) can consume a data service provided through distribution platform 140. The CPE functionally coupled to a cable modem or other device that serves as the network gateway to the dwelling network from the access/delivery network 170.

Features and architecture(s) of the signal monitoring described in the subject specification and annexed drawings are not limited to the foregoing embodiments described in connection with the network environment 100, and can be exploited in substantially any telecommunication network that provide digital services through a variety of data flows.

Figure 2:
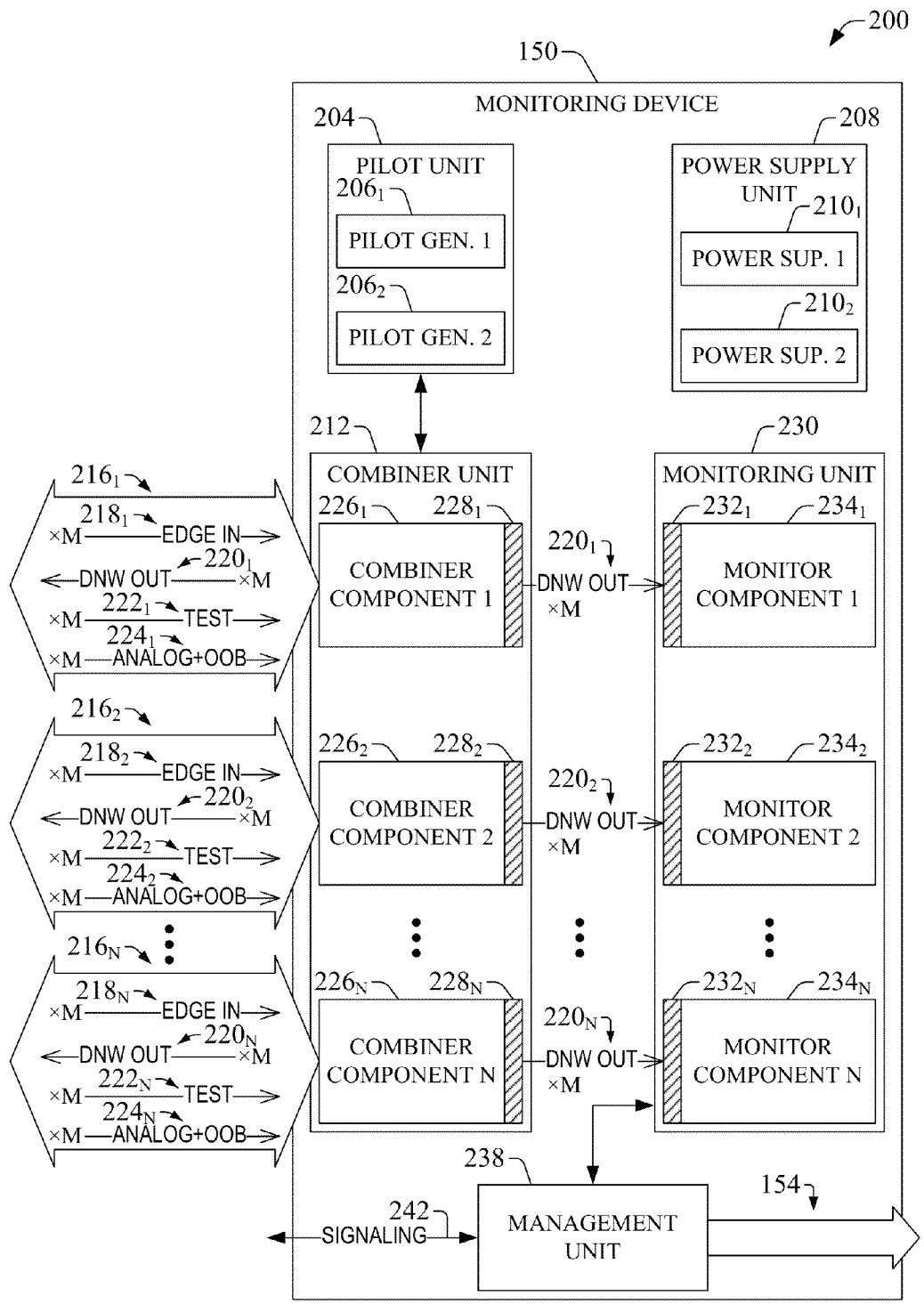
FIG. 2 illustrates an exemplary embodiment of a monitoring device in accordance with at least certain aspects of the disclosure.

FIG. 2 is a block diagram of an exemplary embodiment 200 of a monitoring device 150 in accordance with aspects of the disclosure. Various features of the monitoring device 150 are illustrated through FIGS. 3-6. In certain embodiments, the monitoring device 150 can be a rack-mountable apparatus of a specified height represented in rack units (RUs) of a standardized rack size (e.g., 19 inches wide or 23 inches wide) or a customized rack size. For instance, when installed (e.g., configured, tested, and accepted), the height of the rack-mountable apparatus can be five RUs and fit into a 19 inch rack frame. The rack-mountable apparatus can be a chassis having the functional elements of the monitoring device 150 in according to aspects described herein. In one aspect, specific size of the monitoring device 150 can be determined at least in part by power consumption (net power, power density, etc.) intended to be consumed by the monitoring device 150.

In certain implementations, net power consumption can range from about 700 W to about 1550 W.

In the illustrated embodiment, monitoring device 150 comprises a pilot unit 204 having two pilot generator units (also referred to as pilot generators): pilot generator 1 $206_1$ and pilot generator 2 $206_2$. In other embodiments, more than two pilot generators can be included in monitoring device 150. The number of pilot generators can be determined based on various constraints such as cost (e.g., desired levels of energy consumption and space occupation); integration considerations; scaling suitability; or the like. Each of the pilot generator units $206_1$ and $206_2$ of the pilot unit 204 can be configured to produce a plurality of pilot tones. In one aspect, the plurality of pilot tones can include continuous wave (CW) pilot tones. In another aspect, a pilot tone of the plurality of pilot tones can have a frequency in a range from about 54 MHz to about 1002 MHz. In certain implementations, a first plurality of pilot tones produced by pilot generator $206_1$ can comprise four tones, and a second plurality of pilot tones produced by pilot generator $206_2$ also can comprise four tones. Each of the pilot generators in pilot unit 204 (e.g., pilot generator $206_1$ and pilot generator $206_2$) can output the plurality of pilot tones in accordance with a set of one or more predetermined specifications. As an example, such set can comprise the following specifications: output power range from about 25 dBmV to about 40 dBmV; power accuracy of nearly 2 dB; minimum return loss of about 18 dB; and minimum harmonics generation of about 65 dBc (decibel relative to carrier).

A pilot generator of pilot unit 204 can suppress pilot tones that are not supplied to a functional element of monitor unit 230, such as combiner unit 212. Level of suppression can be at least about 65 dB, even though such level can be configurable and implementation specific.

Pilot unit 204 is functionally coupled to combiner unit 212. The combiner unit 212 generally is a passive element (e.g., an element that need not be energized for operation) and comprises a plurality of combiner components $226_\kappa$, with $\kappa$ a natural number representing an index that adopts values ranging from 1 to N (which is a natural number) in increments of unity; namely $\kappa=1, 2, 3, \ldots N$. The value of N is implementation specific and can be based on architecture of the distribution platform 120, one or more components thereof, scaling considerations and cost-benefit analysis, and generally the value of N can adopt most any value equal to or greater than unity. Illustrative implementation can have N=3, N=5, and N=8. In implementations in which monitoring device 150 is a rack-mounted apparatus, a combiner component $226_\kappa$ can be embodied in a blade that fits into the rack-mounted apparatus. As indicated herein, the rack-mounted apparatus can have a height represented in RUs of a standardized rack size or a customized rack size.

Combiner unit 212 can receive pilot signals (one or more pilot tones) from pilot unit 212 through, at least in part, combiner components $226_\kappa$. In one implementation, combiner unit 212 can receive a first pilot signal (e.g., a primary pilot signal) generated by pilot generator $206_1$ and a second pilot signal (e.g., a backup pilot signal) generated by pilot generator $206_2$. In one aspect, at least one of the combiner components $226_1$-$226_N$ can receive the first and second pilot signals. In another aspect, each of the combiner components $226_\kappa$ can receive the first and second pilot signals.

In addition or in the alternative, combiner unit 212 can receive a group of information streams in the downstream through a group of combiner components $226_1$-$226_Q$, with Q a natural number equal to or less than N. A specific information stream of the group of information streams can comprise one or more of at least one data stream or at least one signaling stream, each of such streams being associated with a non-empty set of downstream subscriber groups (e.g., SG 180, SG 190). For instance, there can be M (a natural number) subscriber groups in such non-empty set. While in certain scenarios M can range from eight to 12, any value of M is contemplated herein. The at least one data stream can be associated with at least one downstream frequency channel, e.g., a finite portion of a band of electromagnetic frequencies, such as radio frequencies (RFs), microwave frequencies, or the like. In exemplary embodiment 200, in one aspect thereof, a group of N information streams comprising data streams edge input (IN) $218_1$ through edge input $218_N$ are received by respective combiner components $226_1$-$226_N$. Each edge input $218_\kappa$ comprises a plurality of data streams associated with M subscriber groups. As described herein, each data stream of the plurality of data streams can be generated by an edge originating node (e.g., a specific one of the one or more edge originating node(s) 124, such as an edge QAM node, a device that consolidates the functionality of a termination system (e.g., a CMTS) and an edge node, such as an edge QAM node, or the like). In certain implementations, each data stream can be a QAM signal of order q (or a q-QAM signal, with q a natural number) such as a 64-QAM signal, a 128-QAM signal, a 256-QAM signal, a 1024-QAM signal, or the like. In another aspect, the group of N information streams comprises a first plurality $222_1$ of signaling streams including M test signals respectively associated with M subscriber groups, and a second plurality $224_1$ of signaling streams including M pre-combined analog and out-of-band (OOB) signals respectively associated with M subscriber groups.

Combiner unit 212 can be configured to receive information streams having input power within a range typical of RF signals. As an example, for an edge input data stream (e.g., edge IN $218_2$), combiner unit 212 can receive 256-QAM input signals having amplitudes that range from about 0 dBmV per carrier to about 60 dBmV per carrier. In alternative scenarios, such signals can be bound from below, having values of at least 0 dBmV per carrier, without an upper bound. As another example, for another or the same edge input data stream, combiner unit 212 can receive 64-QAM input signals having amplitudes that range from about 20 dBmV per carrier to about 31 dBmV per carrier. In the alternative, such signals can be bound from below, having values of at least 20 dBmV per carrier, without an upper bound. Similarly, yet not identically, for signaling streams (e.g., analog+OOB $224_2$), combiner unit 212 can receive, for example, an analog input signal having amplitudes ranging from about 28 dBmV per carrier to 43 dBmV per carrier, whereas combiner unit 212 can receive an OOB input signal having amplitudes ranging from about 20 dBmV per carrier to about 35 dBmV per carrier. In the alternative, such signals can be bound from below, having values of at least 28 dBmV per carrier for OOB signals, and at least 20 dBmV. For other signaling streams, such as test IN $222_N$, combiner unit 212 can receive, for example, a test input signal having an amplitude ranging from about 15 dBmV per carrier to 45 dBmV per carrier. The various test signals (test $222_1$-$222_N$) can result from splitting a single input test signal. An RF switch (not shown) in monitoring device 150 can split the single test signal prior to injection into combiner unit 212. Similarly, yet not identically, the various signaling streams (analog+OOB $224_1$-$224_N$) can result from splitting a single input signaling stream. An RF splitter (not shown) in monitoring device 150 can split the single test signal prior to injection into combiner unit 212. The foregoing exemplary ranges also are representative of input power ranges for information streams having 64-QAM input signals or 1024-QAM input signals. Other ranges of input power also are permitted for the information streams of the disclosure.

Combiner unit 212 can output a plurality of information streams comprising delivery network (DNW) output (OUT) $220_1$ through $220_N$. Each information stream DNW OUT $220_K$ of the plurality of information streams is conveyed by a respective combination component $226_K$ and comprises a group of information streams. In one aspect, each element of the group is a combination of at least one data stream and at least one signaling stream. In certain implementations, the at least one data stream comprises M downstream input flows (e.g., edge IN $218_1$), and the at least one signaling stream comprises M downstream flows that result from the combination of M test signals (e.g., test $222_1$) and M pre-combined analog and OOB signals (e.g., analog+OOB signals $224_1$). In other implementations, the at least one data stream comprises M downstream input flows (e.g., edge IN $218_2$), and the at least one signaling stream comprises M downstream flows that result from the combination of M test signals (e.g., test $222_1$), M pre-combined analog and OOB signals (e.g., analog and OOB signals $224_1$), and a pilot signal resulting from combination of a first pilot signal and a second pilot signal.

Combiner component 212 also can transmit the plurality of information streams DNW OUT $220_1$-$220_N$ to monitoring unit 230 for analysis of such information streams. In one aspect, a combiner component $226_K$ can transmit an information stream DNW OUT $220_K$ to a respective monitor component $234_K$. To at least such end, the combiner component $226_K$ can include or be functionally coupled to one or more input/output (I/O) interface(s) $228_K$ (represented with a hatched block in FIG. 2), and the monitor component $234_K$ can include or be functionally coupled to one or more I/O interface(s) $232_K$ (represented with a hatched block in FIG. 2). The one or more I/O interface(s) $228_K$ can include various types of interfaces, such as F connector(s), BNC connector(s), ganged 75 ohm MCX interface(s), or the like. Yet, in one aspect, for delivery of a plurality of information streams included in DNW OUT $220_K$, I/O interface(s) $228_K$ can exploit a single type of interface for each information stream of the plurality of information stream. In one aspect, each of the interfaces of the one or more interface(s) $228_K$ can operate in a frequency range from about 54 MHz to about 1002 MHz. In another aspect, each of the interfaces of the one or more interface(s) $228_K$ can have a return loss of at least about 16 dB, wherein, in certain implementations, at least one of such interfaces can have a return loss of at least 18 dB. In yet another aspect, each of the interfaces of the one or more interface(s) $228_K$ can have a port-to-port isolation, with respect to adjacent interfaces, of at least about 70 dB in the frequency range from about 50 MHz to about 550 MHz, and of at least about 65 in the frequency range from about 550 MHz to about 1002 MHz.

To perform analysis of information streams, the monitor unit 230 can integrate various functional elements for data collection and processing and, in response to such processing, generation of one or more network performance metrics that permit evaluation of quality of delivered network traffic (e.g., signaling or data). Based on the data processing performed by the monitor unit 230, the quality of the delivered network traffic can refer to (i) communication quality of a packetized data stream (e.g., a quadrature-amplitude-modulated packetized data stream) (ii) communication quality of payload data (e.g., MPEG TS) conveyed in the packetized data stream, or (iii) communication quality of a specific portion of available spectrum of downstream frequencies. In one aspect, the one or more network performance metrics can include at least one communication quality metric related to quality of a packetized data stream, wherein the at least one communication quality metric can comprise one or more of a modulation error ratio (MER), a codeword error rate, forward error correction (FEC) synchronization, QAM lock, MPEG synchronization, a Reed-Solomon (RS) correctable data count, a RS correctable data rate, a RS uncorrectable data count, and a RS uncorrectable data rate. In another aspect related to communication quality of the payload data, the one or more network performance metrics can include one or more of a bitrate of packets having a specific program identifier (PID) and a count of the packets having the specific PID. In yet another aspect, data processing can include extraction, or detection, of specific parameters that characterize payload data in a data stream. As an example, a transport stream identifier (TSID) of an MPEG TS can be detected from the program association table (PAT) thereof. In one aspect related to communication quality of a specific portion of available spectrum of downstream frequencies, the one or more network performance metrics can include amplitude of downstream signal as a function of frequency in such portion, which in certain analysis scenarios can span the full range of available spectrum of downstream frequencies.

Figure 3:
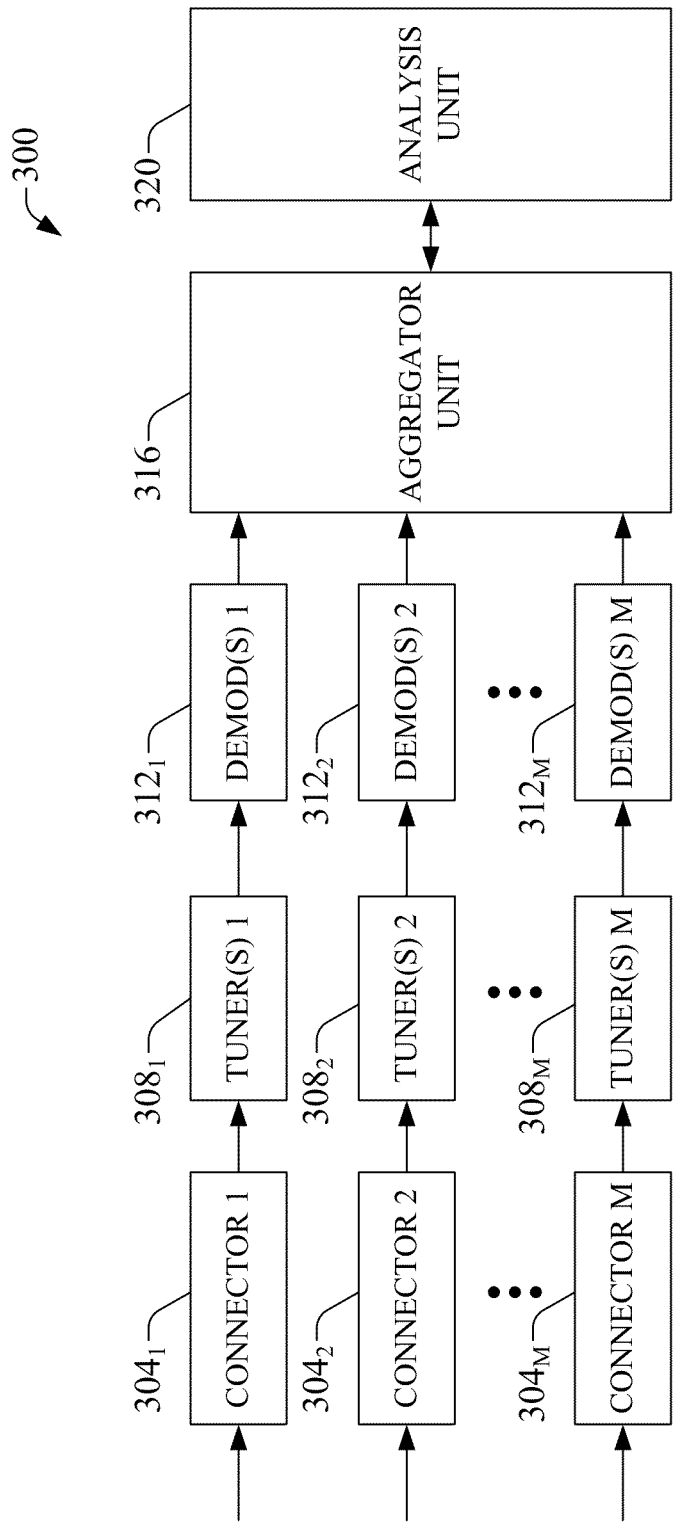
FIG. 3 illustrates an exemplary embodiment of a component of a monitoring device in accordance with at least certain aspects of the disclosure.

As illustrated in exemplary embodiment 300 presented in FIG. 3, a monitor component of monitor unit 230 can comprise a plurality of connectors $304_1$-$304_M$, wherein each connector $304_\lambda$ (also referred to as port $304_\lambda$) is functionally coupled to a group of one or more tuner(s) $308_\lambda$. Here, $\lambda$ is a natural number representing an index that adopts values ranging from 1 to M in increments of unity; namely, $\lambda$=1, 2, 3, ... M. The plurality of connectors $304_1$-$304_M$ can embody a plurality of I/O interface(s) $234_K$.

At least one tuner of the non-empty set of tuners spanned by the groups $308_1$-$308_M$ is configured to receive a plurality of data streams associated with a plurality of downstream frequency channels. Such channels can comprise one or more of a broadcast channel or a narrowcast channel specific to a service group (e.g., SG 180 or SG 190). As an example, the plurality of downstream frequency channels can be a configured frequency allocation defined by one or more of a standard channel plan, a harmonically related channel (HRC) plan, incrementally related channel (IRC) plan, or broadcast channel plan. The plurality of downstream frequency channels can be configurable during operation of the monitoring device 250. In one aspect, the monitoring device 250 can exploit a configuration of such channels that can specify center frequencies for each downstream frequency channel in such plurality in a manner that configuration of a center frequency associated with a downstream frequency channel does not affect (e.g., preclude) configuration of a different center frequency associated with a different frequency channel. Each tuner of the group of one or more tuner(s) $308_\lambda$ is configured to tune frequencies in a predetermined portion $\Delta v$ of the spectrum of downstream frequencies available for transmission of information streams. For example, at least one tuner of such group can tune frequencies in the range from about 54 MHz to about 1002 MHz. In certain implementations, at least one tuner of the group of one or more tuner(s) $308_\lambda$ can be a wideband tuner that can tune frequencies in a band of frequencies $\delta v$ and that is agile for coverage of the interval $\Delta v$. In other implementations, at least one tuner of the group of one or more tuner(s) $308_\lambda$ can be a full-spectrum tuner that can tune a frequency in the interval $\Delta v$.

Figure 4A:
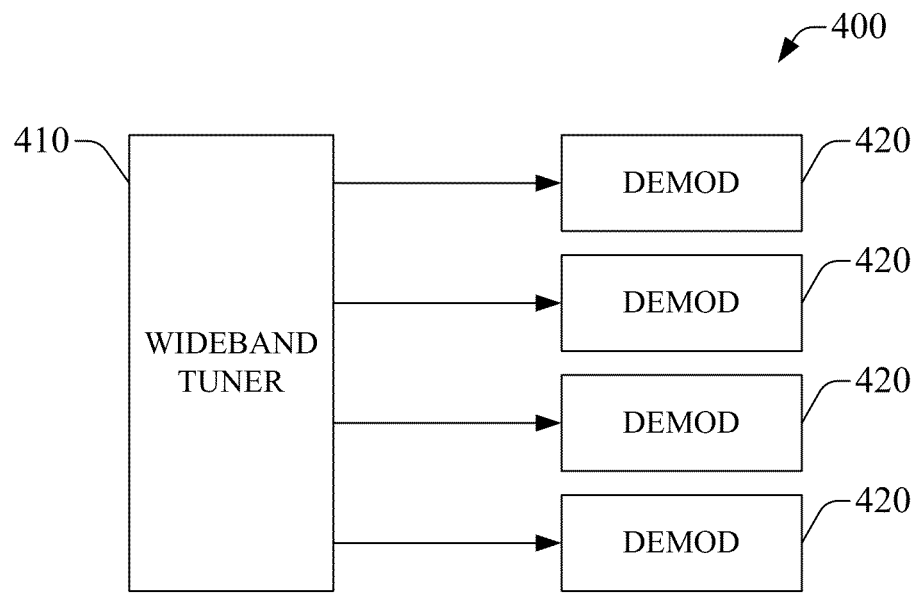
FIGS. 4A-4B present exemplary coupling configurations among tuners and demodulators in a monitoring device in accordance with at least certain aspects described herein.
Figure 4B:
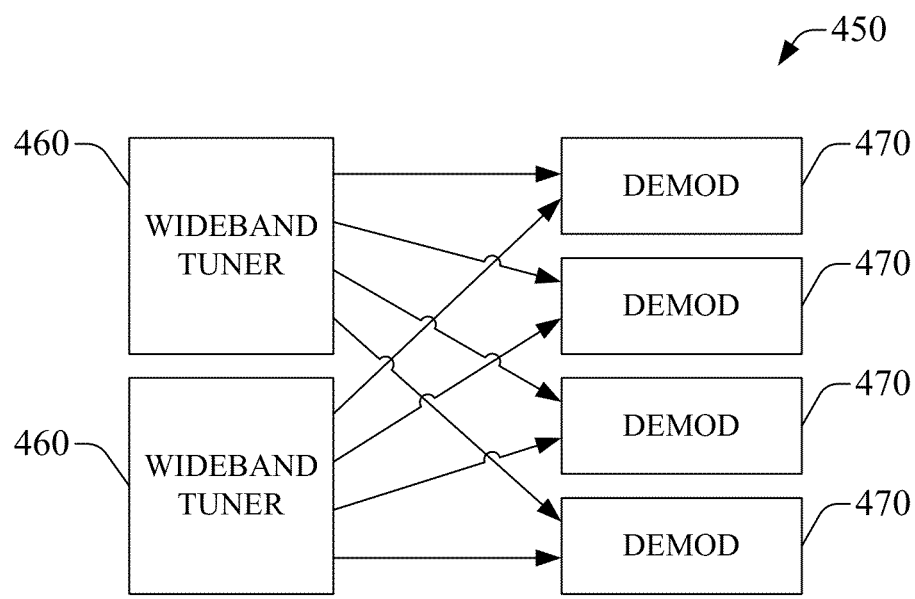

The group of one or more tuner(s) $308_\lambda$ is functionally coupled to a group of one or more demodulator(s) (demod(s)) $312_\lambda$. Such coupling can be implemented in accordance with various configurations having one-to-many relationships, wherein a single tuner is functionally coupled to many demodulators, or many-to-many relationships, wherein many tuners are functionally coupled to many demodulators. As exemplified in diagram 400 of FIG. 4A, a single wideband tuner 410 can be functionally coupled to four demodulators 420 (e.g., QAM demodulators). In the alternative, diagram 450 in FIG. 4B illustrates a configuration in which two wideband tuners 460 functionally coupled to four demodulators 470 (e.g., QAM demodulators). In one aspect, the configuration illustrated in diagram 400 can be implemented for each tuner in the group of tuner(s) 308$_\lambda$. In another aspect, the configuration illustrated in diagram 450 can be implemented for each tuner in the group of tuner(s) 308$_\lambda$. While in the exemplary embodiment 300 the group of one or more tuner(s) 308$_\lambda$ and the group of one or more demod(s) 312$_\lambda$ are illustrated as separate functional elements, in additional or alternative embodiments, such groups can be integrated into a single functional element, such a functional chipset or processor. In such integrated scenario, configurations illustrated in diagrams 400 and 450 also can be implemented.

Coupling among the group of one or more tuner(s) 308$_\lambda$ and the group of one or more demodulator(s) (demod(s)) 312$_\lambda$ allows demodulation of a data stream of the plurality of data streams received by a tuner in such group of tuner(s). The demodulators of groups 312$_1$-312$_M$ can be configured to demodulate at least one data stream of the plurality of data streams. In one aspect, at least one demodulator of the groups 312$_1$-312$_M$ can be a QAM demodulator that can be configured to demodulate one or more of 64-QAM modulated data, a 128-QAM modulated data, 256-QAM modulated data, or 1024-QAM modulated data. In another aspect, at least one demodulator of such groups can be configured to demodulate two or more data streams simultaneously or substantially simultaneously. In yet another aspect, at least three demodulators of a group of one or more demodulators can be parked (e.g., configured to demodulate) at any frequency in the full frequency range of input signals, while providing scanning of other frequencies in such range.

Combiner unit 212 and monitoring unit 230 can be integrated modularly, in a configuration having a specific number of pairs formed of a combiner component and a monitoring component being deployed (e.g., installed, configured, and accepted) in the monitoring device 150. In addition or in the alternative, monitoring device 150 can be extensible, by adding one or more of such pairs to an initial configuration.

In one aspect, the at least one data stream can comprise a predetermined number of data streams (e.g., QAM data streams) that represent the smallest set of data streams that can be demodulated by the demodulators of groups 312$_1$-312$_M$ for the plurality of M service groups. Here, the product of M times N equals P. In another aspect, the predetermined number of data streams can be specific to the type of data delivery, such as broadcast or narrowcast. As an example, for a group of M=8 service groups, the predetermined number of data streams can equal 48 for broadcast QAM data streams. As another example, for each connector in the plurality of connectors 304$_1$-304$_M$, the predetermined number of data streams can equal 16 for narrowcast QAM data streams. For an implementation in accordance with such examples and with N=5, the monitoring device 150 can monitor 5(48+16×8)=880 QAM data streams. More generally, for $n_B$ broadcast QAM data streams and $n_N$ narrowcast QAM data stream, the monitoring device 150 can monitor N($n_B$+$n_N$×M).

At least one demodulator of the groups of demodulators 312$_1$-312$_M$ can demodulate an OOB signal received as part of an information stream (e.g., DNW OUT 220$_1$, DNW OUT 220$_2$, . . . , or DNW OUT 220$_N$). In one aspect, the OOB signal can be formatted in accordance with the Society of Cable Telecommunication Engineers (SCTE) 55 standard. To such end, the at least one demodulator can be a quadrature phase shift keying (QPSK) demodulator. Each group of one or more demod(s) 312$_\lambda$ is functionally coupled to an aggregator unit 316, wherein such aggregator can receive data resulting from demodulation of at least one data stream of the plurality of data streams received by connectors 304$_1$-304$_M$. In one aspect, the aggregator unit 316 can generate statistics of data streams that comprise a multi-program transport stream (MPTS). In another aspect, the aggregator unit 316 can operate as a passthrough element for single-program transport stream (SPTS).

The aggregator unit 316 is functionally coupled to an analysis unit 320, wherein the analysis unit 320 can be configured to analyze data resulting from demodulation of the at least one data stream of the plurality of data streams, and produce at least one communication quality metric based on analysis of the data. As described herein, in one aspect, the at least one data stream can comprise an MPTS, thus the analysis unit 320 can be configured to monitor an MPTS. In another aspect, the at least one data stream can comprise an MPTS, thus the analysis unit 320 can be configured to monitor a SPTS. In one embodiment, a plurality of tuners, a plurality of demodulators, and the analysis unit 320 can be modularly integrated into monitoring unit 230. The plurality of tuners can be formed by one or more groups of tuners (e.g., 308$_1$, 308$_2$, . . . 308$_M$, or combinations thereof) in scenarios in which each of such groups has two or more tuners. Similarly, yet not identically, the plurality of demodulators can be formed by one or more groups of demodulators (e.g., 312$_1$, 312$_2$, . . . 312$_M$, or combinations thereof) in scenarios in which each of such groups has two or more demodulators.

Analysis unit 320 can generate one or more communication quality metrics of the at least one data stream (e.g., a QAM packetized data stream) at the physical layer level. The one or more communication quality metrics can comprise one or more of a MER, a codeword error rate, FEC synchronization, QAM lock, MPEG synchronization, a RS correctable data count, a RS correctable data rate, a RS uncorrectable data count, and a RS uncorrectable data rate. In addition or in the alternative, analysis unit 320 can detect information related to payload data of the at least one data stream. In one aspect, analysis unit 320 can detect a TSID of an MPEG TS from the program association table (PAT) thereof. In another aspect, analysis unit 320 can detect one or more of a stream type, a service descriptor table (SDT) name, a program map table (PMT) name, a source ID from SCTE 65 in-band data, and a service name from SCTE 65 in-band data. In yet another aspect, analysis unit 320 can detect a medium access control (MAC) management message conveyed in an MPEG TS. In yet another aspect, the analysis unit 320 can leverage historical data and detect at least one of a PAT version change or a PMT version change. In response to detection of one or more of such changes, the analysis unit 320 can compare a current structure of a TS associated with a current PAT or a current PMT with an old structure of the TS. A result of the comparison can be supplied to an external functional element (a management unit, a network node, or the like).

Moreover or in the alternative, analysis unit 320 can generate one or more communication quality metrics related to communication quality of the payload data. Such one or more communication quality metrics can comprise one or more of a bitrate of packets having a specific PID (referred to as PID bitrate) and a count of the packets having the specific PID (referred to as PID count). Generation of a PID bitrate is referred to as PID bitrate monitoring. Analysis unit 320 can perform PID bitrate monitoring in real time or nearly in real time. In addition or in the alternative, analysis unit 320 can perform non-real time PID bitrate monitoring, in which PID bitrate monitoring is performed in a specific interval, such as short duration periods (e.g., periods ranging from about a millisecond to a few hundred seconds). Analysis unit 320 can produce averages of PID bitrates (e.g., rolling averages). Based on data generated through PID monitoring, analysis unit 320 can detect presence of a PID discontinuity that can result in media discontinuity. Exemplary PIDs that can be monitored for detection of PID discontinuity can comprise a PID associated with a PMT, a PID associated with a video elementary stream, a PID associated with an audio elementary stream, a PID associated with an enhanced TV binary interchange format (EBIF) data stream, a PID associated with SCTE 35 data programming insertion (DPI) data stream, or the like. Out-of-band PIDs are other exemplary PIDs that analysis unit 320 can monitor to produce PID bitrates and PID continuity counters. In one aspect, monitoring of SCTE 65 OOB data can include (as a requirement, for example) data decryption, which can be implemented by analysis unit 230. In another aspect, as a part of the monitoring, analysis component 230 can detect specific OOB PIDs, such as PIDs associated with programs conveying specific service information (e.g., channel line-up). In yet another aspect, analysis unit 230 also can monitor control-plane PIDs comprising one or more of PAT, conditional access table (CAT), Network 0777, entitlement management message (EMM) Cable Card, EMM ASTB streams (e.g., about 30 streams), and CDL PMT streams (e.g., about 30 streams). In response to monitoring such control-plane PIDs, analysis unit 230 can monitor one or more of changes in continuity counters and generates values of PID bitrates. For certain PIDs, analysis unit 320 can exploit threshold triggers that establish criteria for initiating monitoring such PIDs. A threshold trigger can be reconfigurable and embodied in data or metadata stored in a memory that is part of or functionally coupled to the analysis unit 320.

In one implementation, analysis unit 320 can analyze specific PID to monitor dedicated payload (e.g., video content, audio content, advertisement, or the like). As an illustration, analysis unit 320 can monitor ATSC A/65 PSIP base PID 0x1FFB to permit PSIP monitoring, or data over cable service interface specification (DOCSIS) base PID 0x1FFE to permit generation of such PID bitrates and counts, and establish related discontinuities. In certain embodiments (e.g., exemplary embodiment 500), a non-empty set of computer-readable computer-executable instructions (e.g., analysis instruction(s) 518) retained in a memory (e.g., memory 516), which is part of or is functionally coupled to the analysis unit 320, can configure analysis 320 for such functionality. A processor of analysis unit 320, such as one of processor(s) 508, can execute at least a portion of the computer-readable computer-executable instructions and, in response, cause analysis unit 320 to monitor the foregoing specific PIDs.

In another implementation, analysis unit 320 also can detect critical in-band PIDs such as DTA PID 0x1FF0 and system information (SI) PID 0x1FFC. In certain embodiments (e.g., exemplary embodiment 500), a non-empty set of computer-readable computer-executable instructions (e.g., analysis instruction(s) 518) retained in a memory (e.g., memory 516), which is part of or is functionally coupled to the analysis unit 320, can configure analysis 320 for such functionality. A processor of analysis unit 320, such as one of processor(s) 508, can execute at least a portion of the computer-readable computer-executable instructions and, in response, cause analysis unit 320 to perform such detection.

In one implementation, the one or more quality metrics related to communication quality of the payload data also can comprise a performance metric indicative of TS synchronization loss of a transport stream, wherein the metric include determination of a time offset between detection of a pilot tone and a current timer. For example, analysis unit 320 can determine the TS_synch_loss parameter defined in ETR 101 290 standard. Such quality metrics also can comprise one or more of (i) a performance metric indicative of error in a TS table such as PAT or PMT in an MPEG-2 TS, the performance metric can be PAT_error or PMT_error as defined in the ETR 101 290 standard; (ii) a performance metric indicative of error in delivery of reference content, such as program clock reference (PCR) in an MPEG-2 TS, the performance metric can be PCR_repetition_error or PCR_accuracy_error as defined in the ETR 101 290 standard; and (iii) a performance metric indicative of error in program identity, such as PID_error defined in the ETR 101 290 standard.

In other implementations, as part of generation of the one or more quality metrics related to the communication quality of the payload data, the analysis unit 320 can generate a count for a MAC multicast counter. In addition or in the alternative, the analysis unit 320 can lock on to a specific MAC multicast and, in response, determine packet rate of such multicast. The rate can be determined in blocks per second, packets per second, bits per second, or the like.

In certain implementations, the one or more quality metrics can comprise a performance metric indicative of formatting integrity of a data stream. In one aspect, such performance metric can be a parameter representative of a number of tables present in the data stream. For instance, the parameter can be defined in accordance to the ETR 101 290 standard for MPEG TSs. Analysis unit 320 can detect the number of tables in a data stream. In another aspect, such performance metric can be a parameter indicative of a predetermined volume of data received within a specific time interval. As an example, for an MPEG TS, analysis unit 320 can determine if all or substantially all data in PID 0x1FFC is received at a monitor component (e.g., monitor component 234$_K$) within certain period (e.g., two minutes). As another example, in response to detection of an ATSC A/65 PSIP data stream, the performance metric indicative of formatting integrity can be a parameter indicative of presence or absence of the following tables in the data stream: system time table (STT), master guide table (MGT), terrestrial virtual channel table (TVCT), cable virtual channel table (CVCT), event information table 0 (EIT0), EIT1, EIT2, and EIT3. In addition or in the alternative, the performance metric can be indicative of the table rate for one or more of the STT, MGT, TVCT, CVCT, EIT0, EIT1, EIT2, and EIT3. In yet another aspect, such performance metric can be a parameter indicative of reception of the channel map at the periodic intervals established in the SCTE 65 standard.

Analysis unit 320 can implement other high-level processing of a received information stream. In one scenario, analysis unit 320 determine encryption status of a service (e.g., encrypted or non-encrypted). Encrypted services can comprise conditional access (CA) programs, such as video on demand (VOD) or other pay-per-view (PPV) programs. In another scenario, analysis unit 320 can de-tunnel data conveyed in DOCSIS set-top gateway (DSG) format and extract a channel map from such data. In one embodiment (e.g., exemplary embodiment 500), a non-empty set of computer-readable computer-executable instructions (e.g., analysis instruction(s) 518) retained in a memory (e.g., memory 516), which is part of or is functionally coupled to the analysis unit 320, can configure analysis 320 for such functionality. A processor of analysis unit 320, such as one of processor(s) 508, can execute at least a portion of the computer-readable computer-executable instructions and, in response, cause analysis unit 320 to de-tunnel the data. In yet another scenario, analysis unit 320 can detect in-band SCTE 18 emergency alert system (EAS) events. In the foregoing embodiment, execution of at least a portion of the computer-readable computer-executable instructions can cause analysis unit 320 to perform such detection.

In certain implementations, analysis unit 320 can operate as a spectrum analyzer across various portions of available spectrum of downstream frequencies, such as frequency bands associated with subscriber groups $SG_1$ through $SG_P$. As a result, analysis unit 320 can effect spectral analysis comprising determination of communication quality of a specific portion of available spectrum of downstream frequencies. For example, such communication quality can be represented by frequency dependent performance metrics including downstream signal amplitude as a function of frequency over the specific portion of the available spectrum of downstream frequencies. Such specific portion can be configurable and, in certain scenarios, it can span the full range of frequencies of the downstream spectrum available to a network service provider. In one aspect, analysis unit 320 can exploit adjustable resolution bandwidth for spectral analysis. In another aspect, analysis unit 320 can be configured to perform processes for fast Fourier transformation (FFT), such as discrete Fourier transform (DFT) and its inverse. Various sets of reciprocal space points with $N_{FFT}$ points can be utilized. For instance, $N_{FFT}=512$ or $N_{FFT}=1024$ can be exploited, yielding 512-point DFT or 1024-point DFT and their respective inverses. Such data can be retained in a memory element that can be part of analysis unit 320 (such as memory 516) or is functionally coupled thereto.

In other implementations, analysis unit 320 can decrypt conditional access (CA) encrypted programs. Decryption of a CA program results in content that is available for playout (e.g., MPEG TS playout) as described herein and other analyses. Encrypted content of the CA program can be transmitted to an end-point device as part of DNW OUT stream, wherein the end-point device can decrypt such program for consumption. Two or more CA programs can be decrypted simultaneously or nearly-simultaneously. In one scenario, analysis unit 320 can decrypt at least 36 CA programs simultaneously or nearly simultaneously. In another scenario, analysis unit 320 can decrypt at least 48 programs simultaneously or nearly simultaneously. In one aspect, analysis unit 320 can decrypt programs in accordance with various protocols or standards, such as the CableCARD™ standard utilized for decryption in set-top boxes via dedicated personal computer memory card international association (PCMIA) cards (e.g., one-way CableCARD™ s or two-way CableCARD™ s). In a scenario in which analysis unit 320 decrypts CA content (VOD, PPV content, etc.) according to the CableCARD™ standard, a CableCARD™ pool, as defined conventionally, can be utilized to allow programs from different service groups (e.g., programs conveyed in $SG_1$-$SG_M$) to be concurrently or substantially concurrently decrypted by the analysis unit 320 that is part of a monitor component receiving such programs via an information stream. The CableCARD™ pool can comprise a list of service groups from which a plurality of programs can be decrypted, and data that specifies an OOB signal (e.g., downstream frequency) from which authentication and provisioning can be obtained. In certain implementations, analysis unit 320 can exploit at least two CableCARD™ pools.

As part of analysis of a non-empty set of information streams (e.g., edge IN $218_1$ through edge IN $218_N$), monitoring device 150 can perform baseline measurements of a communication quality metric over a predetermined period. Such baseline measurements provide a baseline value for the communication quality metric and can be performed prior to conducting analysis of the non-empty set of information streams over time intervals longer than the predetermined period. Monitoring device 150, via analysis unit 320, for example, can utilize the baseline value as a reference to assess, or detect, variations of the magnitude of the communication quality metric. In one scenario, monitoring device 150 can perform baseline measurements of a plurality of communication metrics in response to the monitoring device 150 being initialized. Initialization of monitoring device 150 can occur in response to receiving a start-up command. In the alternative, initialization of monitoring device can occur in response to certain events, such as reboot of monitoring device 150, or power-on after power failure. The plurality of communication metrics can include, for example, power level, MER, error rate, and the like.

In certain implementations, monitoring device 150 can provide, via analysis unit 320, for example, alarm signaling based on magnitude of a communication quality metric relative to a specific alarm threshold defined for such metric. In one embodiment of analysis unit 320, e.g., embodiment 500 illustrated in FIG. 5, a memory (e.g., memory 516) can comprise a memory element (e.g., alarm rule(s) 526) having one or more alarm thresholds as part of a non-empty set of alarm rules. Alarm rules can be disabled by management unit 238, for example, as part of configuration of monitoring device 150. The alarm signaling can indicate a performance issue of the network that supplies an information stream to monitoring device 150. The specific alarm threshold can be defined by at least one parameter, which can comprise one or more of a numeric parameter, an alphanumeric parameter, or a string parameter (e.g., "low-low," "low," "high," and "high-high"). Analysis unit 320 can provide the alarm signaling through an alarm message generated according to one of various communication protocols comprising, for example, simple object access protocol (SOAP), simple network management protocol (SNMP), and the like. In exemplary embodiment 200, analysis unit 320 can transmit the alarm message to management unit 238. Depending on the specific protocol utilized for transmission of the alarm message, management unit 238 can include a component (e.g., a trap collector for SOAP based delivery) configured to receive the alarm message (e.g., a trap in SOAP based delivery).

In exemplary embodiment 200, monitoring unit 230 can convey one or more data streams to a management unit 238 included in monitoring device 150. The management unit 238 can be configured to generate output data (e.g., data 154) based at least on the outcome of analysis of the data resulting from demodulation of the at least one data stream of the plurality of data streams. To generate the output data, the management unit 238 can be configured to format data according to various packetized communication protocols. For instance, the various packetized communication protocols can include one or more of an Ethernet protocol format; an internet protocol (IP) format, such as IPv4 and IPv6, or the like; or a user datagram protocol (UDP) format. In one exemplary implementation, management unit 238 can pack at least seven MPEG packets within a UDP frame. In another implementation, management unit 238 can pack at most seven MPEG packets within a UDP frame.

For analysis that includes evaluation of communication quality of a data stream, output data can comprise real-time or nearly real-time constellation data for one or more data streams, transmit power for such data streams, symbol rate, MER, or the like. In a scenario, the constellation data can correspond to a single QAM data stream. In another scenario, the constellation data can correspond to at least two QAM data streams. In yet another scenario, the constellation data can correspond to at most four QAM data streams. Management unit 238 can deliver at least a portion of the constellation data to a network node (e.g., a device) for rendering thereof. In one aspect, such constellation data can be rendered through a web-based interface. In another aspect, at least the portion of the constellation data can be rendered in conjunction with one or more of transmit power, symbol rate, or MER.

Additionally or in the alternative, the management unit 238 can be configured to transmit to a network node (e.g., a specific node of network node(s) 130) at least a portion of the output data. Transmission of the portion of the MPEG TS is referred to as TS playout. The management unit 238 can transmit at least the portion of the output data in accordance with a packetized communication protocol supported by the network node, e.g., Ethernet, UDP, IPv4, IPv6, or the like. The management unit 238 also can be configured to encapsulate the portion of the output data with Ethernet header(s), IP header(s), and UDP header(s). The portion of the output data can be transmitted in a multicast data stream to several multicast destinations (e.g., multicast logical addresses of network nodes), or in a unicast data stream to one or more unicast destinations (e.g., unicast logical address(es) of network node(s)). In certain implementations, the one or more unicast destinations comprise at least two unicast logical addresses. Monitoring device 150 can acquire at least one multicast destination of the several multicast destinations from data representative, or characteristic, of an edge originating node, the data can include a source blade identifier, a port identifier, a QAM multiplexer identifier, or the like. In one aspect, monitoring device 250 can acquire the at least one multicast destination through management unit 238. In connection with transmission of a multicast data stream, management unit 238 can format the data in accordance with various communication protocols, including, for example, IP multicast protocols. In one aspect, management unit 238 can format such data according to protocol independent multicast sparse mode (PIM-SM) with standard streaming metafile (SSM) extensions. In another aspect, management unit 238 can format a multicast data stream in accordance with internet group management protocol (IGMP) with SSM extensions. As an example, IGMP, version 3, with SSM extensions can be employed. In yet another aspect, management unit 238 can utilize IGMP, version 2, can be employed. In still another aspect, management unit 238 can manage one or more multicast data stream via multicast listener discovery (MLD).

In a scenario in which a portion of output data comprises a selected portion of an MPEG TS, the network node can be a moving picture expert group (MPEG)-layer probe device. More generally, the selected portion of the MPEG TS can be transmitted to most any network node that can analyze such transport streams. The MPEG TS can be a specific MPEG transport stream (TS) of the plurality of data streams received at the monitoring unit 230. In one aspect, the MPEG TS can be part of incoming QAM streams or OOB streams.

To implement MPEG TS playout, in one aspect, monitoring unit 230 can be configured to filter packets of a specific PID in a TS. Such filtering is referred to as PID filtering. Monitoring device 250 substantially maintains unchanged the payload data in each data stream of a plurality of data streams received at the monitor unit 230. In scenarios in which PID filtering is effected, monitoring device 250 selects a portion of received payload data without altering the content of such payload data. In certain implementations, analysis unit 230 can perform the PID filtering. To at least such end, a configurable PID list comprising a plurality of PIDs (e.g., 32 PIDs) per TS can be retained in analysis unit 230. Such list is an inclusion list in that PIDs enumerated in the list are utilized for extraction from the TS. In alternative or additional implementations, the list can be an exclusion list. For MPTS, PID filtering can be performed according to program based on a program number rather than a group of specific PID associated with the program. In one aspect, configuration of the list of PIDs can be accomplished, at least in part, through management unit 238, wherein an I/O interface (see, e.g., FIG. 6) can permit configuration of the list, e.g., selection of a PID or exclusion of a PID of the set of PIDs available in a TS. Similarly, yet not identically, the I/O interface (see, e.g., FIG. 6) can permit, at least in part, configuration of a list of programs to be filtered.

Figure 6:
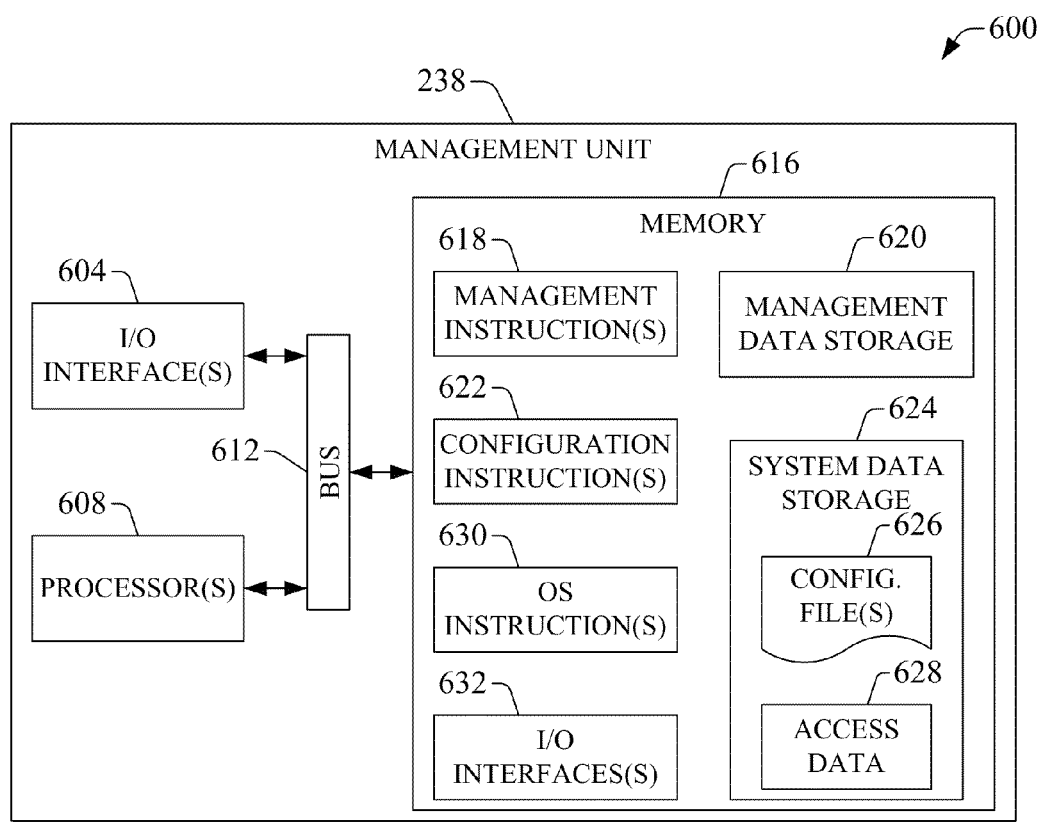

In the illustrated embodiment 600 presented in FIG. 6, at least one I/O interface of the one or more I/O interface(s) 604 can enable TS playout. For example, the at least one I/O interface can comprise a 10 Gigabit Ethernet (10 GbE) interface based on a predetermined physical layer (PHY) module, such as small form factor pluggable (XFP) or enhanced small form-factor pluggable (SFP+), and other pluggable devices. The 10 GbE is compliant with one of the IEEE 802.a-e standards. In one aspect, each of the at least one I/O interface can be configured to playout a TS from any QAM stream received at the monitoring device 150.

Functionality of monitoring device 250 described herein can be configurable or controllable, or both. One or more agents (a user device of a network administrator, a user device of a field engineer, a network node, etc.) can configure or control monitoring device 250. Management unit 238 can permit configuration of such functionality by receiving and processing (e.g., parsing, executing, parsing and executing, or the like) one or more configuration instructions (e.g., configuration command(s)) and related payload data through signaling 242. In addition or in the alternative, management unit 238 can permit control of functionality of the monitoring device 150 by receiving and processing (e.g., parsing, executing, parsing and executing, or the like) one or more or control instructions (e.g., control command(s)) and related payload data through signaling 242. In a scenario in which several agents can configure or control the monitoring device 150, management unit 238 can administer multi-user access for the plurality of agents. In one aspect, signaling 242 can be an OOB signal carrying a control instruction or a configuration instruction. Signaling 242 can be received at management unit 238 from an electronic device (a handheld computing device, a laptop computer, etc.) external to the monitoring device 150.

To permit at least configuration and control of monitoring device 150, management unit 238 can implement a console terminal interface that enables access to a command line interface (CLI) for OOB control and configuration. Access to the CLI can be attained through various secure connection protocols, such as secure shell (SSH) connection protocol (e.g., SSH version 2), secure sockets layer (SSL), transport layer security (TLS), Kerberos, remote authentication dial in user service (RADIUS), terminal access controller access-control system plus (TACACS+), Diameter, or the like. In certain embodiments, such as exemplary embodiment 600, a group of one or more computer-executable instructions that embody at least one of the secure connection protocols can be retained in memory element 618, referred to as management instruction(s) 618. In such exemplary embodiment, credentials that enable implementation of a secure connection protocol, such as security certificates, public keys, private keys, key identifiers, passwords, and the like, can be retained in system data storage 624, in a memory element referred to as access data 628. Management unit 238 can implement (e.g., execute) at least one of the various secure connection protocols. In one aspect of such implementation, management unit 238 can encrypt a connection between an agent (e.g., a user device) and monitoring device 150. In another aspect of such implementation, management unit 238 can receive (e.g., import) a security certificate. An interface of the one or more I/O interface(s) 604 can enable, at least in part, the CLI. Such interface can be, for example, a 10 GbE interface. In the alternative or in addition, such interface can be, for example, a universal serial bus (USB) interface (e.g., a USB 2.0 Type B receptacle). Management unit 238 can implement an additional or alternative out-of-band management interface that can enable, at least in part, the CLI. For instance, such management interface can be one of a 10 Mbps Ethernet interface, a 100 Mbps Ethernet interface, or a 1000 Mbps Ethernet interface. In certain implementations, management unit 238 can exploit an I/O interface embodied in a non-empty set of computer-executable instructions (e.g., an application programming interface (API)) retained in memory 616 as memory element I/O interface(s) 632. Such I/O interface can enable communication (e.g., reception, transmission, or reception and transmission) of signaling 242 with an agent. For example, the I/O interface can be a SOAP based API. For another example, the I/O interface can be representational state transfer (REST) based API.

A control command of the one or more control instructions can be directed to importing a configuration file. In such scenario, management unit 238 can execute the command and, in response, acquire the configuration file. In another aspect, a control command of the one or more control instructions can be directed to editing a configuration file. In such scenario, management unit 238 can execute the command and, in response, modify the configuration file. Specific modification of the configuration file depends on the command and can comprise addition of content, removal of content, reorganization of content, etc. In yet another aspect, a command of the one or more control instructions can be directed to exporting a configuration file. In such scenario, management unit 238 can execute the command and, in response, deliver the configuration file to an external device. The one or more control instructions (e.g., control commands) can be part of a non-empty set of commands that management unit 238 can execute. In certain embodiments, such as exemplary embodiment 600, the non-empty set of commands can comprise at least one computer-executable instruction and can be retained in memory 616 as part of the one or more configuration instruction(s) 622.

A configuration file can convey one or more parameters that define at least one operational feature of monitoring device 250. The configuration file can establish a current configuration of the monitoring device 250. In such scenario, reconfiguration of the monitoring device 250 can comprise replacement of the configuration file with a different configuration file. In certain scenarios, a plurality of configuration files can be utilized to configure functionality of monitoring device 250. In one aspect, the plurality of configuration files can comprise a group of one or more configuration files that define a current configuration of monitoring device 250, and at least one configuration file that defines one or more parameters that augment the current configuration. In another aspect, the plurality of configuration files can define a current configuration of monitoring device 250, wherein each configuration file of the plurality of configuration files can comprise a non-empty set of parameters that define a specific category of functionality, e.g., QAM monitoring, MPEG TS playout, decryption, or the like. In addition or in the alternative to a configuration file, other data structure(s) can be employed to configure one or more parameters that determine operational features of monitoring device 250.

In one aspect, a configuration file can establish one or more of a logical address configuration; a TS tuning configuration; an alarm configuration; a decryption configuration; TS playout configuration; and pilot generation configuration. Logical address configuration. At least one parameter can enable dynamic host configuration protocol (DHCP) configuration of an Ethernet interface of monitoring device 250, or static internet protocol (IP) configuration of such interface. In the exemplary embodiment 600, the Ethernet interface can be a specific one of the one or more I/O interface(s) 604. TS Tuning configuration. The configuration file can comprise a list of a non-empty set of downstream frequency channels (also referred to as channels) associated with at least one connector that is part of monitoring unit 230. In exemplary embodiment 600, the configuration file can be retained in system data storage 624 as part of configuration file(s) 626. For example, the list can convey a plurality of such channels for each connector that is part of the one or more I/O interface(s) $232_K$ functionally coupled to monitoring component $234_K$. For another example, the list can convey a plurality of downstream frequency channels for each monitoring component $234_K$. The list can comprise a plurality of data structures indicative of center frequency of a channel in the non-empty set of channels, QAM name, channel name, monitoring status, monitoring setting(s). In one aspect, the channel name can be obtained from data indicative of the channel map conveyed by DSG data. In another aspect, the monitoring setting(s) can adopt values that depend on the monitoring state. In addition or in the alternative, the configuration file can include a period for scanning the non-empty set of downstream frequency channels. For a scanning protocol based on a round robin algorithm, such period can be the overall round-robin time interval in which monitoring device 250 can accomplish a round. A value of the monitoring setting can be representative of the round-robin time. Alarm configuration. The configuration file can include at least one parameter that defines an alarm threshold for a communication quality metric determined by monitoring device 150. In one scenario, the configuration file comprises a plurality of parameters that defines a plurality of alarm thresholds for each communication quality metric. In addition or in the alternative, the configuration file can include at least one parameter to establish an alarm threshold for an environmental quality of an area wherein monitoring device 150. Such environmental quality can be, for example, one of a temperature, a level of power supplied to the monitoring device, or a level of heat extraction provide by a cooling device. Decryption configuration. The configuration file can comprise at least one parameter indicative of a port (e.g., a connector, or a connector and a logical definition thereof, such as a logical address associated with the connector) that can receive an OOB signal, and a frequency for an OOB signal. In addition or in the alternative, the configuration file can comprise one or more parameters that can define objects associated with a CableCARD™ pool: (a) one or more interfaces in the monitoring device 250 (e.g., interface(s) 2320, (b) a list of CableCARD™ s, and (c) a single OOB signal. Moreover or as another alternative, the configuration file can define a list of programs for decryption, wherein such list can comprise data representative of a port, a QAM, a program number, an address of a destination port such as an IP port or a UDP port. TS playout configuration. The configuration file can include at least one parameter that specifies at least one QAM stream for TS playout in accordance with aspects described herein.

Configuration file(s) can be retained in management unit 238 in accordance with various formats, such as extensible markup language (XML). As illustrated in exemplary embodiment 600, one or more configuration file(s) 626 can be retained in a memory element in memory 616, such as system data storage 624. As part of storage of a configuration file, management unit 238 can be configured to verify the integrity of the configuration file. In an aspect, management unit 238 can provide a command that, in response to execution by a processor (e.g., a processor of the group of one or more processor(s) 608), cause the management unit 238 to perform a portable operating system interface for Unix (POSIX)-compliant MD5 checksum on the configuration file. Such command is a computer-executable instruction and can be retained in memory 616 as part of a memory element therein, such as configuration instruction(s) 622.

Control commands that regulate functionality of monitoring device 150 can comprise at least one control instruction to request (e.g., poll) analysis data from monitoring device 150. The at least one control instruction can embody a process for polling monitoring device 150 for analysis data. As an example, such process can be implemented as a SOAP method. The at least one control instruction can be received from an agent or a network node (e.g., a specific one of the one or more network node(s) 160). In response to receiving the at least one control instruction, management unit 238 can acquire requested analysis data from analysis unit 320. In addition, management unit 238 can supply (e.g., push) at least a portion of the requested analysis data to a requesting device, such as an agent of the network node. To supply the data, management unit 238 can, for example, format the data in accordance with a communication protocol specified by the requesting device. In one implementation, to acquire the requested analysis data, management unit 238 can convey a query for data to the analysis unit 320. In response to receiving the query, analysis unit 320 can convey at least a portion of the data. In addition or in the alternative, analysis unit 320 can convey status information, such as data, indicative of status of response to the query, query unfulfilled, query partially fulfilled, or query fulfilled. Management unit 238 can receive one or more of the portion of the data or the status information, and supply such data or the status information, or both, to the requesting device. In certain implementations, to supply (e.g., push) the portion of the data, management unit 238 can execute one or more control instructions that, in response to execution, cause the management unit 238 to transmit (e.g., push) the portion of the data to the requesting device. The one or more control instructions can be retained in memory element 618, referred to as management instruction(s) 618. In one aspect, such control instructions can embody a process for pushing acquired data to a requesting device. As an example, such process can be implemented as a SOAP method.

In monitoring device 150, redundancy is afforded for functional elements that are critical to providing service. As illustrated in the exemplary embodiment 200, monitoring device 150 includes a power supply unit 208 comprising two power supplies—power supply 1 210$_1$ and power supply 2 210$_2$—which provide redundancy for power provision. Power supply unit 208 can include direct current (DC) power source(s) or alternate current (AC) power source(s). In contrast, in one aspect, redundancy may not be afforded for combiner unit 212 in view of the passive characteristic of its components (combiner components 218$_1$-218$_N$). In another aspect, management unit 234 and monitoring unit 230 are not implemented in a redundant configuration.

Figure 5:
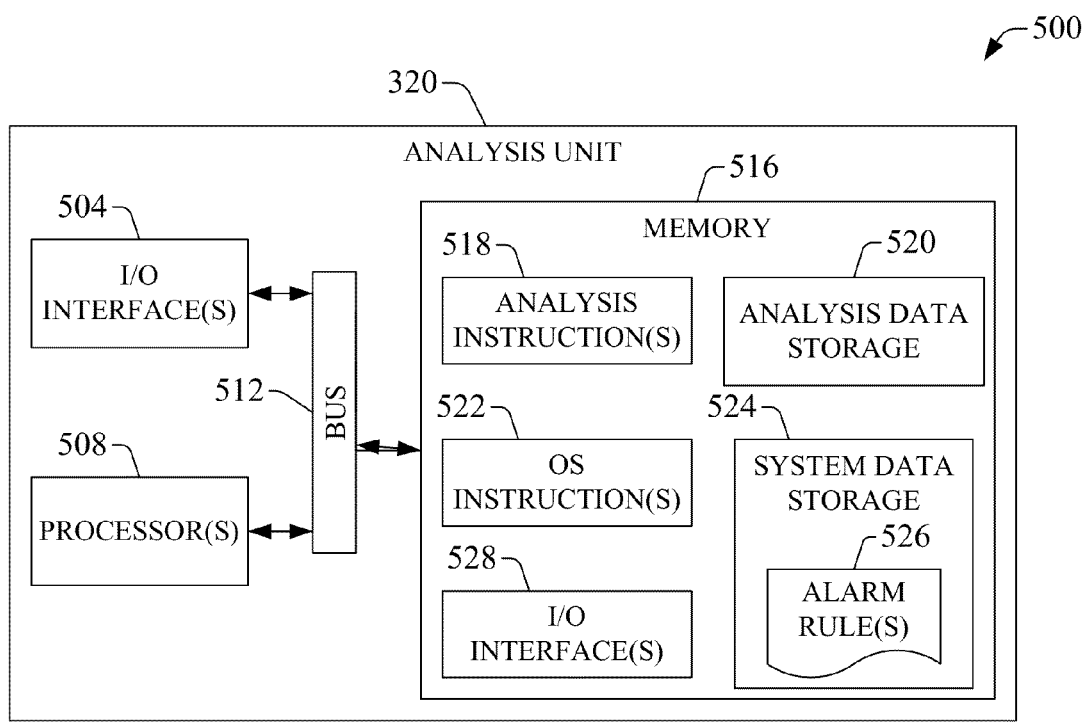
FIGS. 5-6 are block diagrams of exemplary embodiments of units of a monitoring device in accordance with at least certain aspects of the disclosure.

As described herein, FIG. 5 is a block diagram of an exemplary embodiment 500 of an analysis unit 320 in accordance with aspects of the disclosure. In the illustrated embodiment, analysis unit 320 comprises a group of one or more I/O interface(s) 504, a group of one or more processor(s) 508, a memory 516, and a bus 512 that functionally couples (e.g., communicatively couples) various functional elements of the analysis unit 320 including the group of one or more processor(s) 508 to the memory 516. In scenarios in which operation of analysis unit 320 is critical to network performance, such as in guaranteed service quality (e.g., guaranteed bit rate) scenarios, the group of one or more processor(s) 508 comprises a plurality of processors that can exploit concurrent computing.

Data and computer-accessible instructions, e.g., computer-readable instructions and computer-executable instructions, related to monitoring signals, such as data streams (broadcast data streams, narrowcast data streams, unicast data streams, etc.) or signaling streams, can be retained in memory 516. Such data and instructions can permit implementation of the analysis functionality described herein. In one aspect, the computer-accessible instructions can embody any number of programming code instructions or program modules that permit specific functionality. In the subject specification and annexed drawings, memory elements are illustrated as discrete blocks, however, such memory elements and related computer-accessible instructions, e.g., computer-readable and computer-executable instructions, and data can reside at various times in different storage elements (registers, files, memory addresses, etc.; not shown) in memory 516.

Analysis data storage 520 can comprise a variety of data and metadata related to analysis of one or more of PHY-layer level features or payload data features of an information stream. For example, data retained in analysis data storage 520 can comprise data indicative of spectral regions at which signal is to be analyzed or monitored, data indicative of parameters employed in computation of a communication quality metric, and so forth. Memory 516 also can comprise one or more computer-executable instruction(s) for the analysis described herein. Such computer-executable instructions retained as a memory element 518 which is represented as block 518 labeled analysis instruction(s) 518. In one aspect, analysis instruction(s) 518 can be stored as an implementation (e.g., a compiled instance) of one or more computer-executable instructions that implement and thus provide at least the functionality of the methods described herein. Analysis instruction(s) 518 also can be transmitted across some form of computer readable media.

Memory 516 can be embodied in a variety of computer-readable media. Exemplary computer-readable media can be any available media that is accessible by a processor in a computing device, such as one processor of the group of one or more processor(s) 508, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be utilized to store the desired information and which can be accessed by a computer or a processor therein or functionally coupled thereto.

Memory 516 can comprise computer-readable non-transitory storage media in the form of volatile memory, such as random access memory (RAM), electrically erasable programmable read-only memory (EEPROM), and the like, or non-volatile memory such as read only memory (ROM). In one aspect, memory 516 can be partitioned into a system memory (not shown) that can contain data and/or programming modules that enable essential operation and control of analysis unit 320. Such program modules can be implemented (e.g., compiled and stored) in memory element 522, referred to as operating system (OS) instruction(s) 522, whereas such data can be system data that is retained in memory element 524, referred to as system data storage 524. The OS instruction(s) 522 and system data storage 524 can be immediately accessible to and/or are presently operated on by at least one processor of the group of one or more processor(s) 508. The OS instructions 522 can embody an operating system for the analysis unit 320. Specific implementation of such OS can depend in part on architectural complexity of the analysis unit 320. Higher complexity affords higher-level OSs. Example operating systems can include Unix, Linux, iOS, Windows operating system, and substantially any operating system for a computing device.

Memory 516 can comprise other removable/non-removable, volatile/non-volatile computer-readable non-transitory storage media. As an example, memory 516 can include a mass storage unit (not shown) which can provide non-volatile storage of computer code, computer readable instructions, data structures, program modules, and other data for the analysis unit 320. A specific implementation of such mass storage unit (not shown) can depend on desired form factor of a monitoring device including the analysis unit 320, and space available for deployment of the analysis unit 320. For suitable form factors and sizes of the monitoring device, the mass storage unit (not shown) can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), or the like.

Features of signal monitoring described herein can be performed in response to execution of software components (e.g., one or more implementations of analysis instruction(s) 518) by a processor. In particular, yet not exclusively, to provide the specific functionality of analysis unit 320, a processor of the group of one or more processor(s) 508 in analysis unit 510 can execute at least a portion of analysis instruction(s) 518, consuming data from or injecting data into analysis data storage 520 in accordance with aspects of the disclosure.

In general, a processor of the group of one or more processor(s) 508 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processor(s) 508 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processor(s) 508 can be implemented as a combination of computing processing units.

The one or more input/output (I/O) interface(s) 504 can functionally couple (e.g., communicatively couple) analysis unit 320 to another functional element of a monitoring device 150. For example, and described herein, an interface of the group of one or more I/O interface(s) 504 can functionally couple analysis unit 320 to management unit 238. For another example, an interface of the group of one or more I/O interface(s) 504 can functionally couple analysis unit 320 to aggregator unit 316. Functionality of the analysis unit 320 that is associated with data I/O or signaling I/O can be accomplished in response to execution, by a processor of the group of one or more processor(s) 508, of at least one I/O interface retained in memory element 528. Such memory element being represented by the block I/O interface(s) 528. In some embodiments, the at least one I/O interface embodies an API that permit exchange of data or signaling, or both, via an I/O interface of I/O interface(s) 504. In certain embodiments, the one or more I/O interface(s) 504 can include at least one port that can permit connection of the analysis unit 320 to other functional element of a monitoring device (e.g., monitoring device 150) that includes the analysis unit 320. In one or more scenarios, the at least one port can comprise network adaptor(s) such as those present in reference links, and other network nodes. In other scenarios, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like. The at least one I/O interface of the one or more I/O interface(s) 504 can enable delivery of output (e.g., output data, output signaling) to such functional element. Such output can represent an outcome, or a result, of an analysis method or action performed by analysis unit 320 in accordance with aspects described herein. In one aspect, the output can comprise at least one communication quality metric determined in accordance with aspects of the disclosure.

Bus 512 represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like.

As described herein, FIG. 6 is a block diagram of an exemplary embodiment 600 of a management unit 238 in accordance with aspects of the disclosure. In the illustrated embodiment, management unit 238 comprises a group of one or more I/O interface(s) 604, a group of one or more processor(s) 608, a memory 616, and a bus 612 that functionally couples (e.g., communicatively couples) various functional elements of the management unit 238 including the group of one or more processor(s) 608 to the memory 616.

Similarly, yet not identically, to analysis unit 320, in scenarios in which operation of management unit 238 is critical to network performance, such as in guaranteed bit rate scenarios, the group of one or more processor(s) 608 comprises a plurality of processors that can exploit concurrent computing.

Data and computer-accessible instructions, e.g., computer-readable computer-executable instructions, related to monitoring signals, such as data streams (broadcast data streams, narrowcast data streams, unicast data streams, etc.) or signaling streams, can be retained in memory 616. Such data and instructions can permit implementation of the management functionality described herein. In one aspect, the computer-accessible instructions can embody any number of programming code instructions or program modules that permit specific functionality. As described herein, a memory element that is part of or functionally coupled to memory 616 is illustrated as a discrete block. However, such memory element and related computer-executable instructions and data can reside at various times in different storage elements (registers, files, memory addresses, etc.; not shown) in memory 616.

A memory element 620, represented as a block labeled management data storage 620, can comprise a variety of data and metadata related to management of signal monitoring, and related operation of monitoring device 150, as described herein. In one aspect, data retained in management data storage 620 can comprise one or more logical addresses (IP addresses, session initiation protocol (SIP) addresses, URI paths, etc.) of a network node (e.g., a specific one of the group of one or more network node(s) 160) that can receive data, such as TS playout data, and signaling from management unit 238. In another aspect, management data storage 620 can retain payload data transported in one or more information streams (e.g., one or more of data streams edge IN $218_1$, edge IN $218_1$, ... edge IN $218_N$). In yet another aspect, at least a portion of data resulting from analysis of an information stream at the PHY-layer or analysis of payload data thereof can be retained in management data storage 620. In one scenario, referred to as caching scenario, management data storage can retain an image (or a logical replica) of data retained in analysis data storage 520. Such caching scenario can speed-up TS playout when performance of one or more of analysis unit 320 or management unit 238 is I/O bound.

As illustrated, various blocks of computer-accessible instructions related to signal monitoring can be retained in memory 616. A first block of computer-accessible instructions is embodied in memory element 618, represented as the block labeled management instruction(s) 618. A second block of computer-accessible instructions is embodied in memory element 622, represented as the block labeled configuration instruction(s) 622. Either the first block or the second block, or both, can be retained in memory 616 as implementation(s) (e.g., compiled instance(s)) of one or more computer-executable instructions that implement and thus provide at least the functionality of one or more of the methods described herein. Computer-accessible instructions within management instruction(s) 618 or configuration instruction(s) 622 can be transmitted across some form of computer readable media.

Memory 616 can be embodied in a variety of computer-readable media. Exemplary computer-readable media can be any available media that is accessible by a processor in a computing device, such as one processor of the group of one or more processor(s) 608, and comprises, for example, both volatile and non-volatile media, removable and non-removable media. As an example, computer-readable media can comprise "computer storage media," or "computer-readable storage media," and "communications media." Such storage media can be non-transitory storage media. "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer or a processor therein or functionally coupled thereto.

Memory 616 can comprise computer-readable non-transitory storage media in the form of volatile memory, such as random access memory (RAM), electrically erasable programmable read-only memory (EEPROM), and the like, or non-volatile memory such as read only memory (ROM). In one aspect, memory 616 can be partitioned into a system memory (not shown) that can contain data and/or programming modules that enable essential operation and control of analysis unit 320. Such program modules can be implemented (e.g., compiled and stored) in memory element 622, represented with a block labeled operating system (OS) instruction(s) 630, whereas such data can be system data that is retained in memory element 624, referred to as system data storage 624. The OS instruction(s) 630 and system data storage 624 can be immediately accessible to and/or are presently operated on by at least one processor of the group of one or more processor(s) 608. Example operating systems can include Unix, Linux, iOS, Windows operating system, and substantially any operating system for a computing device.

Memory 616 can comprise other removable/non-removable, volatile/non-volatile computer-readable non-transitory storage media. As an example, memory 616 can include a mass storage unit (not shown) which can provide non-volatile storage of computer code, computer readable instructions, data structures, program modules, and other data for the management unit 238. A specific implementation of such mass storage unit (not shown) can depend on desired form factor of a monitoring device including the management unit 238, and space available for deployment of the analysis unit 320. For suitable form factors and sizes of the monitoring device, the mass storage unit (not shown) can be, for example, a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Features of signal monitoring described herein can be performed in response to execution of software components (e.g., one or more implementations of management instruction(s) 618 or configuration instruction(s) 622) by a processor. In one aspect, to provide the specific functionality of management unit 238, a processor of the group of one or more processor(s) 608 in management unit 238 can execute at least a portion of management instruction(s) 618 or at least a portion of configuration instruction(s) 622, consuming data from or injecting data into management data storage 620 or system data storage 624 in accordance with aspects of the disclosure. For example, execution of at least one computer-executable instruction of configuration instruction(s) 622 can utilize data included in a specific one of the one or more configuration file(s) 626. For another example, execution of at least one instruction of the management instruction(s) 618 can utilize a portion of data retained in memory element 628, referred to as access data 628.

In general, a processor of the group of one or more processor(s) 608 can refer to any computing processing unit or processing device comprising a single-core processor, a single-core processor with software multithread execution capability, multi-core processors, multi-core processors with software multithread execution capability, multi-core processors with hardware multithread technology, parallel platforms, and parallel platforms with distributed shared memory (e.g., a cache). In addition or in the alternative, a processor of the group of one or more processor(s) 608 can refer to an integrated circuit with dedicated functionality, such as an application specific integrated circuit (ASIC), a digital signal processor (DSP), a field programmable gate array (FPGA), a complex programmable logic device (CPLD), a discrete gate or transistor logic, discrete hardware components, or any combination thereof designed to perform the functions described herein. In one aspect, processors referred to herein can exploit nano-scale architectures such as, molecular and quantum-dot based transistors, switches and gates, in order to optimize space usage (e.g., improve form factor) or enhance performance of the computing devices that can implement the various aspects of the disclosure. In another aspect, the one or more processor(s) 608 can be implemented as a combination of computing processing units.

The one or more input/output (I/O) interface(s) 604 can functionally couple (e.g., communicatively couple) management unit 238 to other functional element of a monitoring device 150 or to an external functional element (e.g., a node of network node(s) 160). For example, as described herein, an interface of the group of one or more I/O interface(s) 604 can functionally couple management unit 238 to analysis unit 320. For another example, an interface of the group of one or more I/O interface(s) 604 can functionally couple management unit 238 to a network node of the network node(s) 160, via data and signaling pipe 154. In one scenario, such node can be embodied in an analysis device or analysis probe.

At least one I/O interface of the one or more I/O interface(s) 604 can enable delivery of output (e.g., output data, output signaling) to another network node (either intra-network node or inter-network node) or a peripheral device. Such output can represent an outcome, or result, of a method or action therein. In one aspect, such output can be any representation (textual, graphical, aural, etc.) of data or signaling resulting from implementation (e.g., execution) of the methods (or processes) for routing an emergency call under fault conditions for a subscriber of packet-switching voice service.

In addition in the alternative to enabling management unit 238 to be functionally coupled to other network nodes, at least I/O interface (e.g., a network card or adaptor) of the one or more network interface(s) 604 can functionally couple the management unit 238 to management platform 120, which can enable remote service and maintenance (S&M), control of monitoring device 150. Moreover or as another alternative, at least I/O interface (e.g., a network card or adaptor) of the one or more network interface(s) 604 can enable the monitoring device comprising the management unit 238 to be functionally coupled to a peripheral device, which can be an output device or an input device. Input devices can permit certain S&M of a monitoring device comprising management unit 238, or local monitoring at a field site in which such monitoring device is deployed. In the latter scenario, an input can be embodied in an local field device, temporarily coupled to the monitoring device that includes the management unit 238.

In general, output devices can include speakers, a display device, a printer, and the like, whereas input devices can include a keyboard or other type of data entry device, such as a microphone, a camera, a pointing device, a joystick, an optical scanner, an RF identification (RFID) reader, gesture-based input devices such as tactile input devices (e.g., touch screens, wearable devices, or the like), speech recognition devices, natural interfaces, and the like. It should be appreciated that in certain embodiments, design and implementation may result in certain of the foregoing input devices being available or configured for usage in a monitoring device having the management unit 238, while others are unavailable.

The one or more I/O interface(s) 604 can include at least one port that can permit connection of a monitoring device comprising management unit 238 to peripheral devices, network adaptors such as those present in reference links, and other network nodes (network node(s) 160, management platform 120, etc.). In one aspect, the at least one port can include one or more of a parallel port (e.g., GPIB, IEEE-1284), a serial port (e.g., RS-232, universal serial bus (USB), FireWire or IEEE-1394), an Ethernet port, a V.35 port, or the like.

Bus 612 represents one or more of several types of bus structures, including a memory bus or memory controller, a peripheral bus, an accelerated graphics port, and a processor or local bus using any of a variety of bus architectures. As an example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB), and the like.

Figure 7:
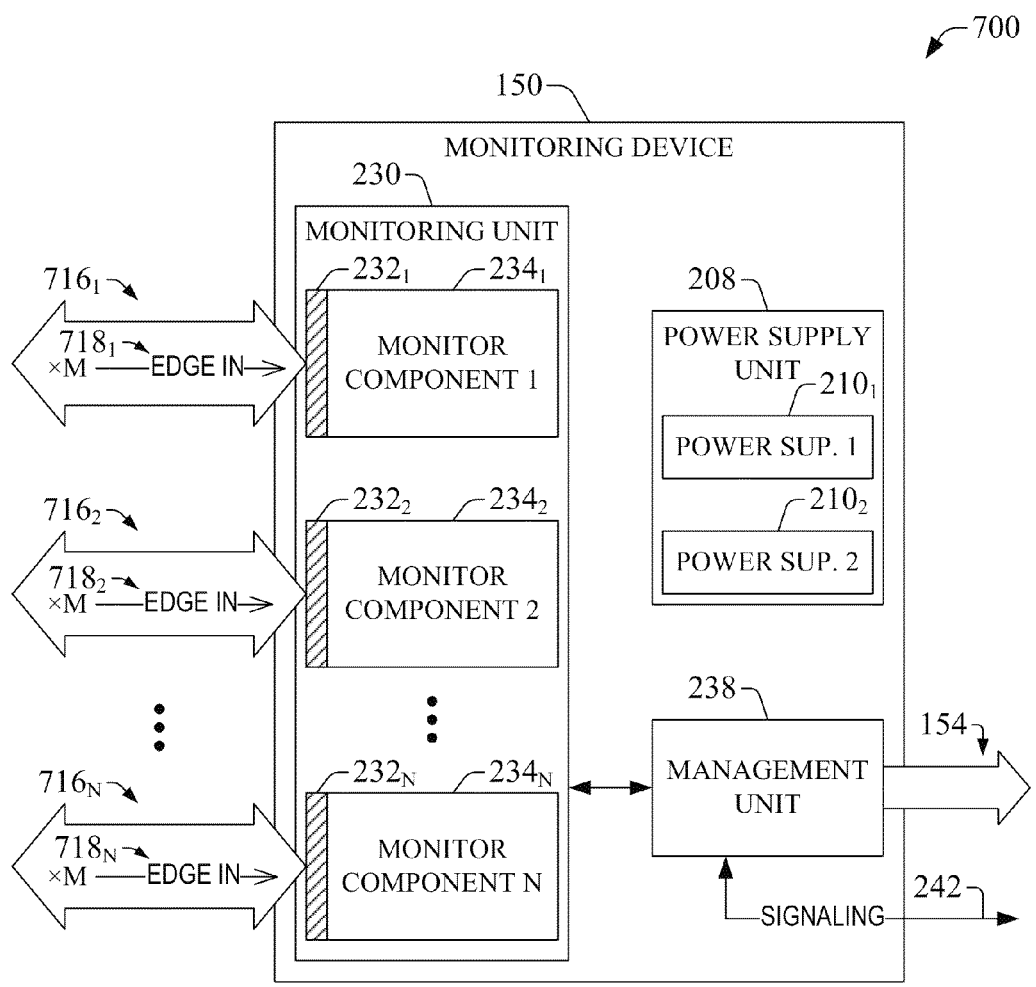
FIG. 7 is a block diagram of another exemplary embodiment of a monitoring device in accordance with at least certain aspects of the disclosure.

FIG. 7 is a block diagram of an exemplary embodiment 700 of a monitoring device 150 in accordance with aspects of the disclosure. In such embodiment, the monitoring device 150 operates as a monitoring without signal combining functionality or pilot generation functionality. Accordingly, the monitoring device 150 in exemplary embodiment 700 can have smaller form factor, such as a smaller rack size, than that in exemplary embodiment 200. For instance, when installed (e.g., configured, tested, and accepted), the height of the rack-mountable apparatus can be three RUs and fit into a 19 inch rack frame. As illustrated, monitoring device 150 of exemplary embodiment 700 comprises power supply unit 208, monitoring unit 230, and management unit 238. Such units can operate in accordance with functionality described herein in connection with exemplary embodiment 200. In one aspect, each monitoring component $234_K$ can receive a plurality of M data streams edge IN $718_K$. Data in such data streams can be analyzed, played out, or reported as described herein.

Figure 8:
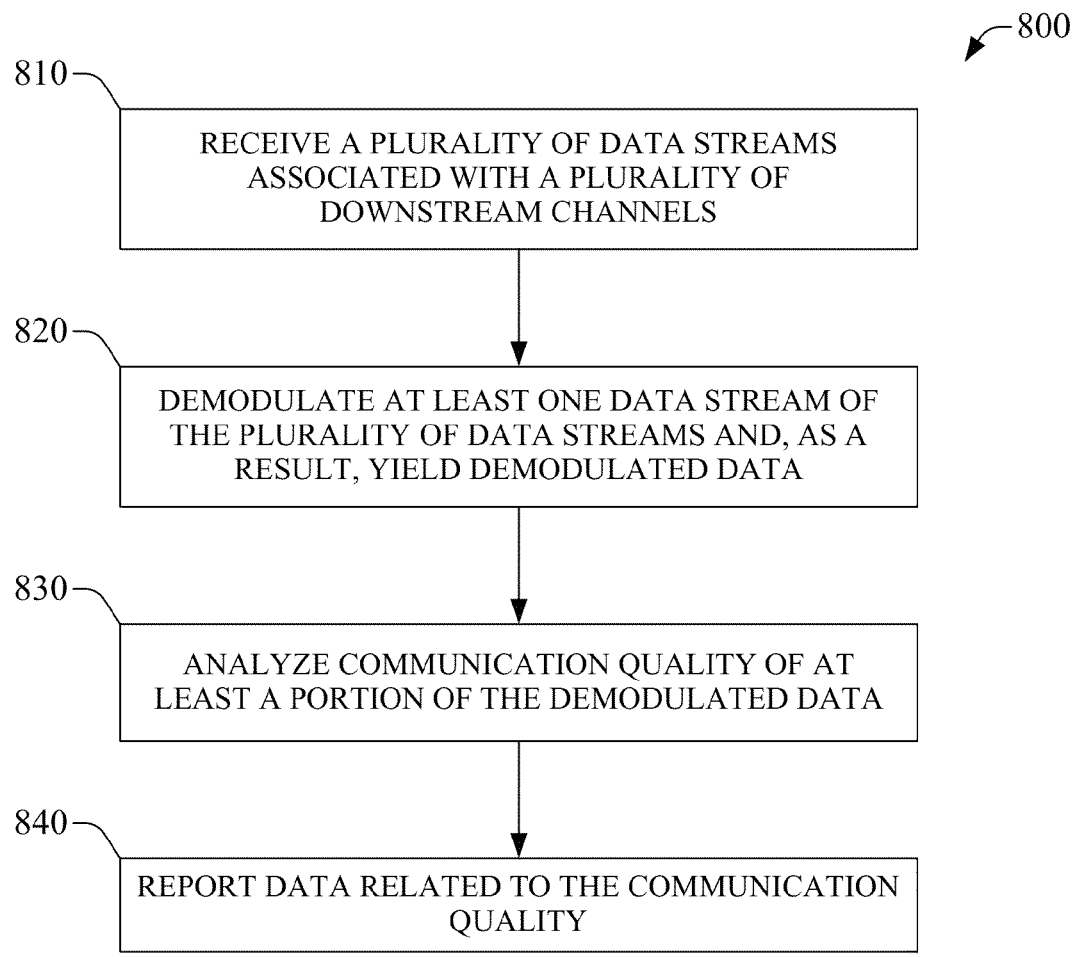
FIG. 8 presents an exemplary method for monitoring payload data in downstream channels in accordance with at least certain aspects of the disclosure.
Figure 9:
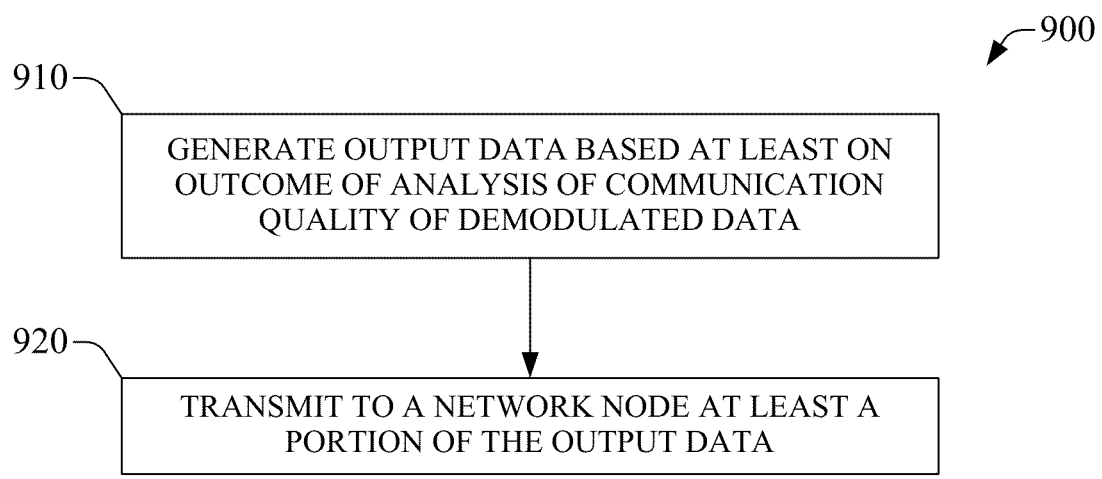
FIG. 9 illustrates an exemplary method for reporting data representative of communication quality determined according to at least certain aspects of the disclosure.
Figure 10:
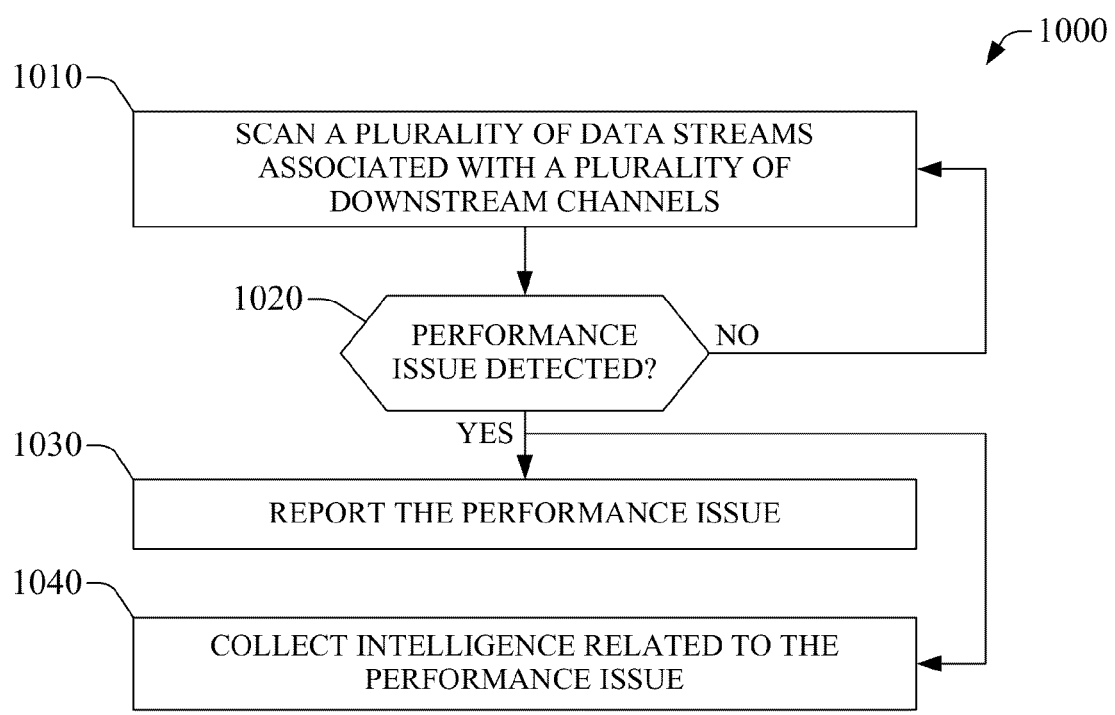
FIG. 10 presents an exemplary method for monitoring payload data in the downstream related to various digital services in accordance with at least certain aspects of the disclosure.

In view of the various aspects of monitoring communication quality of data streams and signaling streams described herein, exemplary methods that can be implemented in accordance with the disclosed subject matter can be better appreciated with reference to the flowcharts in FIGS. 8-10. For simplicity of explanation, the exemplary methods disclosed herein are presented and described as a series of actions (also referred to as steps), pictorially represented with a block or as a delivered or received message in a call flow. However, it is to be understood and appreciated that implementation, and related advantages, of such methods is not limited by the order of actions, as some actions may occur in different orders and/or concurrently with other actions from that shown and described herein. For example, the various methods (also referred to as processes) of the subject disclosure can alternatively be represented as a series of interrelated states or events, such as in a state diagram. Moreover, when disparate functional elements (network nodes, units, etc.) implement disparate portions of the methods of the subject disclosure, an interaction diagram or a call flow can represent such methods or processes. Furthermore, not all illustrated actions or messages may be required to implement a method in accordance with the subject disclosure. Further yet, in the illustrated call flows, messages related to routing the emergency call are represented with an open-head arrow to pictorially indicate that one or more network component(s) in addition to those illustrated as receiving a message can enable delivery and related reception of the message within the call flow.

The methods disclosed throughout the subject specification and annexed drawings can be stored on an article of manufacture, or computer-readable storage medium, to permit transporting and transferring such methods to computing devices (e.g., blade computers, mobile computers, mobile telephones, and the like) for execution, and thus implementation, by a processor or for storage in a memory. Such methods can be stored in the article of manufacture as a group of computer-readable computer-executable instructions (e.g., programming code instructions or programming modules). Generally, computer-readable computer-executable instructions can comprise computer code, routines, objects, components, data structures (e.g., metadata objects, data object, control objects), and so forth that can be configured (e.g., coded or programmed, linked, compiled, and combinations thereof) to perform a particular action or implement particular abstract data types in response to execution by a processor.

A monitoring device of the disclosure, such as monitoring device 150, can implement one or more of the exemplary methods 800, 900, or 1000. As described herein, implementing such method can comprise compiling computer-executable instructions, linking computer-executable instructions, compiling and linking computer-executable instructions; executing computer-executable instructions; compiling and executing computer-executable instructions; or compiling, linking, and executing computer-executable instructions.

FIG. 8 is a flowchart of an exemplary method 800 for monitoring payload data in downstream channels in accordance with aspects of the disclosure. Such data can be associated with various digital services provided by a telecommunication network (e.g., network environment 100). In certain embodiments, a monitoring unit (e.g., monitoring unit 230), or a functional element therein, that can be part of a monitoring device (e.g., monitoring device 150) can implement (e.g., execute) exemplary method 800. At block 810 a plurality of data streams associated with a plurality of downstream channels is received. In one aspect, the plurality of data streams can be received by at least one tuner (e.g., a tuner of the one or more tuner(s) $308_2$). Block 810 is referred to as a receiving step, which, in one aspect, can comprise receiving at least one data stream from a specific downstream frequency channel. In another aspect, the receiving step can comprise scanning the plurality of downstream frequency channels according to a predetermined scanning protocol. In such scenario, the at least one tuner can be configured according to the scanning protocol, which can comprise a schedule for scanning a channel, data indicative of one or more channels to be scanned, or the like.

In one embodiment, the scanning protocol can be retained in a memory element (file, register, database, etc.) that is part of or functionally coupled to the monitoring device that implements the subject exemplary method. For example, the scanning protocol can be retained in system data storage 624, as part of configuration file(s) 626.

At block 820, at least one data stream of the plurality of data streams is demodulated. In one aspect, at least one demodulator (e.g., a demodulator of the one or more demodulator(s) $312_2$) functionally coupled to the at least one tuner can demodulate the at least one data stream. Block 820 is referred to as a demodulating step. In one aspect, the demodulating step comprises demodulating at least two data streams simultaneously.

At block 830, communication quality of data resulting from the demodulating step is analyzed. In one aspect, an analysis component (e.g., an analysis unit 320) that is functionally coupled to the at least one demodulator can analyze such data. Block 830 is referred to as the analyzing step. In one aspect, the analyzing step comprises filtering data resulting from the demodulating step for a suitable moving picture expert group (MPEG) table. In another aspect, the analyzing step comprises generating at least one communication quality metric including one or more of a modulation error ratio, a codeword error rate, FEC synchronization, QAM lock, MPEG synchronization, a packet identifier (PID) bitrate, a PID count, a RS correctable data count, a RS correctable data rate, a RS uncorrectable data count, and a RS uncorrectable data rate. In yet another aspect, the analyzing step comprises monitoring an MPTS. In still another aspect, the analyzing step comprises monitoring a SPTS. In another aspect, the analyzing step comprises detecting a TS identifier (ID) from a program association table (PAT). In other aspect, the analyzing step can comprise detecting transport stream (TS) synchronization loss of a data stream of the plurality of data streams.

Data related to, or associated with, the communication quality can be reported at block 840. In one aspect, management unit 238, or a functional element therein, can report such data (which can be referred to as output data), as described herein.

FIG. 9 is a flowchart of an exemplary method 900 for reporting data representative of communication quality determined according to aspects of the disclosure. In one aspect, the exemplary method 900 is an embodiment of block 840. At block 910, output data based at least on outcome of analysis of communication quality of demodulated data is generated. In one aspect, the analysis unit that implements block 530 can generate such output data. Block 910 can be referred to as a generating step. In certain embodiments, the generating step comprises generating a plurality of multicast data streams. In addition or in the alternative, in such embodiments, the generating step can comprise formatting the output data according to one or more of an Ethernet protocol format or an internet protocol (IP) format. The IP format can include transmission control protocol (TCP) format or a user datagram protocol (UDP) format. At block 920, at least a portion of the output data is transmitted to a network node. In one scenario, the network node can be a functional element of management platform 120. At least the portion of the output data can be transmitted in a multicast data stream or in a unicast data stream. For example, the network node can be one of network node(s) 160.

FIG. 10 is a flowchart of an exemplary method 1000 for monitoring payload data in the downstream related to various digital services in accordance with aspects of the disclosure. In certain embodiments, a monitoring device in accordance with the disclosure, such as monitoring device 150, can implement (e.g., execute) exemplary method 1000. At block 1010, a plurality of data streams associated with a plurality of downstream channels is scanned. In one aspect, a monitoring unit comprising at least one tuner (one tuner, two or more tuners, etc.) and at least one demodulator (one demodulator, two or more demodulators, etc.) can implement block 1010. At block 1020, based on the data obtained in the scanning step (or implementation of block 1010), it is determined if a performance issue is present. In one aspect, as described herein, determining presence of a performance issue can include comparing at least a portion of the data with at least predefined performance threshold or benchmark information (data, signaling, metadata, etc.). In the negative case, implementation flow is directed to block 1010. In the alternative, the performance issue is deemed to have been detected and, in response to such detection, the performance issue is reported at act 1030. In another aspect, as described herein, reporting the performance issue can comprise triggering an alarm and transmitting data indicative thereof. Amount of information reported, e.g., transmitted, can be determined at least in part by network resources (memory storage, bandwidth, etc.) available for such communication. In certain embodiments, the alarm can be a configured simple network management protocol (SNMP) trap and triggering the alarm can comprise delivering the SNMP trap to a network node (e.g., a configured SNMP trap collector) functionally coupled to the monitoring unit (e.g., monitoring unit 220). At act 1040, as a further response to the detection, intelligence associated with the performance issue is collected. Collecting of such intelligence can comprise storing one or more communication metrics and other data indicative of network performance, such as an identifier of a service group in which a performance issue is detected, type of information streams (e.g., linear programming or non-linear assets) for which the performance issue is detected, and the like. The intelligence (e.g., data, signaling, metadata, etc.) can be retained in a memory, such as analysis data storage 520 or management data storage 620, accessible by a network node (e.g., a node of network node(s) 160) functionally coupled to the memory. In addition or in the alternative, the intelligence can be transmitted to a device external to the monitoring device that implements (e.g., executes) the subject exemplary method 1000. In one or more embodiments, the response to detection of the performance issue can be different, with one of block 1030 or 1040 being implemented in response to such detection.

Monitoring and analysis capabilities integrated within the disclosed signal monitoring platform can mitigate service outages and maintain network performance within intended performance targets. The disclosed signal monitoring platform can include high-capacity packet-based playout functionality, with sophisticated forwarding rules and filtering rules to permit local or remote probes to perform supplementary or complementary analysis of communication quality on a continuous basis or event-triggered basis. Various advantages related to monitoring of information data streams—at the PHY-layer level and in connection with transported payload data—that are transmitted as part of a digital service in a telecommunication network emerge from foregoing description. As one exemplary advantage, the signal monitoring platform described herein can integrate redundant pilot signal generation; downstream signal combination and analysis; and content playout to a network node for analysis that is supplementary or complementary to the analysis performed at the signal monitoring platform. Such downstream signal combination results in simplified cabling and reduced form factors at deployment sites. As another exemplary advantage, a signal monitoring platform disclosed herein can provide a broad scope of coverage of potential issues with a specific service by integrating a high density of signal demodulators which can permit monitoring a high volume of downstream carriers. As yet another exemplary advantage, the signal monitoring platform described herein can improve user experience by increasing monitoring scope in an access/delivery network. Improved monitoring between nodes in a distribution platform, nodes in an access/delivery network, and CPE can reduce operational cost and repair time by exploiting always-on monitoring that can identify and isolate problems through various types of analysis.

While the systems, apparatuses, and methods have been described in connection with exemplary embodiments and specific illustrations, it is not intended that the scope be limited to the particular embodiments set forth, as the embodiments herein are intended in all respects to be illustrative rather than restrictive.

Unless otherwise expressly stated, it is in no way intended that any protocol, procedure, process, or method set forth herein be construed as requiring that its acts or steps be performed in a specific order. Accordingly, in the subject specification, where description of a process or method does not actually recite an order to be followed by its acts or steps or it is not otherwise specifically recited in the claims or descriptions of the subject disclosure that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

It will be apparent that various modifications and variations can be made without departing from the scope or spirit of the subject disclosure. Other embodiments of the subject disclosure will be apparent from consideration of the subject specification and practice of the subject disclosure as disclosed herein. It is intended that the specification and examples be considered as non-limiting illustrations only, with a true scope and spirit of the subject disclosure being indicated by the following claims.

What is claimed is:

1. A device, comprising:
   a plurality of tuners configured to receive a plurality of data transmissions associated with a plurality of frequency channels;
   a plurality of demodulators each coupled to at least one tuner of the plurality of tuners, each demodulator of the plurality of demodulators being configured to demodulate at least one data transmission of the plurality of data transmissions;
   an analysis unit configured to analyze data resulting from demodulation of the at least one data transmission of the plurality of data transmissions, resulting in analysis data comprising at least one communication quality metric; and
   a management unit configured to transmit to a network node at least a portion of the analysis data in a format specified by the network node, the portion of the analysis data being transmitted in a multicast data transmission or a unicast data transmission.

2. The device of claim 1, wherein the plurality of data transmissions is associated with a plurality of service groups.

3. The device of claim 1, wherein at least one demodulator of the plurality of demodulators is one of a quadrature amplitude modulation (QAM) demodulator or a quadrature phase shift keying (QPSK) demodulator.

4. The device of claim 3, wherein the at least one demodulator being configured to demodulate 64-QAM or 256-QAM modulated data.

5. The device of claim 1, wherein at least one demodulator of the plurality of demodulators is further configured to demodulate two or more data transmissions substantially simultaneously.

6. The device of claim 1, wherein the at least one communication quality metric comprises one or more of a modulation error ratio, a codeword error rate, forward error correction (FEC) synchronization, quadrature amplitude modulation (QAM) lock, moving picture expert group (MPEG) synchronization, a Reed-Solomon correctable data count, a Reed-Solomon correctable data rate, a Reed-Solomon uncorrectable data count, and a Reed-Solomon uncorrectable data rate.

7. The device of claim 1, wherein the analysis unit is further configured to filter at least a portion of the data resulting from demodulation of the at least one data transmission of the plurality of data transmissions for a suitable moving picture experts group (MPEG) table.

8. The device of claim 1, wherein the analysis unit is further configured to monitor at least one of a multi-program transport stream (MPTS) or a single-program transport stream (SPTS).

9. The device of claim 1, wherein the analysis unit is further configured to detect transport data transmission synchronization loss of a data transmission of the plurality of data transmissions.

10. The device of claim 1, wherein the management unit is configured to format the analysis data according to one or more of an Ethernet protocol format or an internet protocol (IP) format, the IP format comprising at least one of a transmission control protocol (TCP) format or a user datagram protocol (UDP) format.

11. The device of claim 1, wherein the management unit is further configured to play out a specific moving picture expert group transport data transmission (MPEG TS) of the plurality of data transmissions.

12. The device of claim 1, wherein the plurality of tuners, the plurality of demodulators, and the analysis unit are modularly integrated into a single monitoring unit.

13. The device of claim 1, further comprising at least two pilot generator units, each pilot generator unit of the at least two pilot generator units being configured to produce a plurality of pilot tones.

14. A method, comprising:
receiving, by at least one tuner, a plurality of data transmissions associated with a plurality of frequency channels;
demodulating, through at least one demodulator coupled to the at least one tuner, at least one data transmission of the plurality of data transmissions;
analyzing, by an analysis unit coupled to the at least one demodulator, communication quality of data resulting from the demodulating step;
generating, by the analysis unit, analysis data based at least on an outcome of the analyzing step; and
transmitting to a network node at least a portion of the analysis data in a format specified by the network node, the portion of the analysis data being transmitted in a multicast data transmission.

15. The method of claim 14, wherein the receiving step comprises receiving at least one data transmission associated with a plurality of frequency channels from a specific frequency channel.

16. The method of claim 14, wherein the receiving step comprises scanning the plurality of frequency channels according to a predetermined scanning protocol.

17. The method of claim 14, wherein the demodulating step comprises demodulating at least two data transmissions substantially simultaneously.

18. The method of claim 14, wherein the analyzing step comprises filtering data resulting from the demodulating step for a suitable moving picture expert group (MPEG) table.

19. The method of claim 14, wherein the analyzing step comprises generating at least one communication quality metric including one or more of a modulation error ratio, a codeword error rate, forward error correction (FEC) synchronization, quadrature amplitude modulation (QAM) lock, moving picture expert group (MPEG) synchronization, a packet identifier (PID) bitrate, a PID count, a Reed-Solomon correctable data count, a Reed-Solomon correctable data rate, a Reed-Solomon uncorrectable data count, and a Reed-Solomon uncorrectable data rate.

20. The method of claim 14, wherein the analyzing step comprises monitoring at least one of a multi-program transport stream (MPTS) or a single-program transport stream (SPTS).

21. The method of claim 14, wherein the analyzing step comprises detecting at least one of a TS identifier (ID) from a program association table (PAT) or transport data transmission synchronization loss of a data transmission of the plurality of data transmissions.

22. The method of claim 14, wherein the generating step further comprises generating a plurality of multicast data transmissions.

23. The method of claim 14, wherein the generating step comprises formatting the analysis data according to one or more of an Ethernet protocol format or an internet protocol (IP) format, wherein the IP format comprises at least one of a transmission control protocol (TCP) format or a user datagram protocol (UDP) format.

24. A system comprising:
an edge node; and
a device coupled to the edge node through a communication link, the device comprising a monitoring unit configured to,
receive, through a plurality of tuners, a plurality of data transmissions associated with a plurality of frequency channels,
demodulate, through a plurality of demodulators, a east one data transmission of the plurality of data transmissions,
analyze data resulting from the demodulating action and producing at least one communication quality metric based at least on the analyzing action,
generate analysis data comprising the at least one communication quality metric, and
transmit to a network node at least a portion of the analysis data in a format specified by the network node, the portion of the analysis data being transmitted in a multicast data transmission or a unicast data transmission.

25. The system of claim 24, wherein the network node is configured to receive the analysis data from the device, wherein the analysis data is formatted according to one or more of an Ethernet protocol format or an internet protocol (IP) format, wherein the IP format comprises at least one of a transmission communication protocol (TCP) format or a user datagram protocol (UDP) format.

* * * * *

UNITED STATES PATENT AND TRADEMARK OFFICE
CERTIFICATE OF CORRECTION

PATENT NO. : 8,705,639 B2
APPLICATION NO. : 13/277091
DATED : April 22, 2014
INVENTOR(S) : Jorge D. Salinger It is certified that error appears in the above-identified patent and that said Letters Patent is hereby corrected as shown below:

IN THE SPECIFICATION

In column 3, line 18, replace "otherwise" with -- otherwise. --

In column 3, line 61, replace "features such" with -- features of such --

In column 5, line 1, replace "prior before" with -- before --

In column 5, line 22, replace "aspect of integration" with -- aspect, integration --

In column 6, line 4, replace "SS#7), etc.)" with -- SS#7, etc.) --

In column 6, line 23, replace "a conventional" with -- conventional --

In column 7, line 3, replace "such encoding" with -- such as encoding --

In column 8, lines 42-43, replace "CPE functionally" with -- CPE can be functionally --

In column 8, line 64, replace "in according" with -- according --

In column 10, line 5, replace "such non-empty" with -- such a non-empty --

In column 11, line 40, replace "stream" with -- streams --

In column 11, line 55, replace "generation of" with -- generate --

In column 13, line 16, replace "such a" with -- such as a --

In column 16, line 36, replace "within certain" with -- within a certain --

Signed and Sealed this
Seventh Day of July, 2015

Michelle K. Lee
*Director of the United States Patent and Trademark Office*

CERTIFICATE OF CORRECTION (continued)

U.S. Pat. No. 8,705,639 B2

In column 19, lines 43-44, replace "In yet another aspect, management unit 238 can utilize IGMP, version 2, can be employed" with -- In yet another aspect, management unit 238 can utilize IGMP, version 2 --

In column 22, line 50, replace "provide" with -- provided --

In column 29, line 65, replace "an local" with -- a local --

In column 34, line 22, replace "is no" with -- is in no --

IN THE CLAIMS

In column 36, line number 45, replace "a east" with -- at least --